(12) United States Patent
Tateyama

(10) Patent No.: US 7,392,409 B2
(45) Date of Patent: Jun. 24, 2008

(54) DATA PROCESSING APPARATUS AND POWER CONTROL METHOD

(75) Inventor: Jiro Tateyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 830 days.

(21) Appl. No.: 10/202,829

(22) Filed: Jul. 26, 2002

(65) Prior Publication Data
US 2003/0025930 A1      Feb. 6, 2003

(30) Foreign Application Priority Data
Aug. 1, 2001    (JP)    .............................. 2001-233823

(51) Int. Cl.
*G06F 1/00*    (2006.01)
(52) U.S. Cl. ........................ 713/310; 713/320; 713/322; 713/323; 713/340; 358/1.14
(58) Field of Classification Search ................ 358/1.15, 358/1.14, 1.13; 713/320, 310, 321, 322, 713/323, 324, 330, 340
See application file for complete search history.

(56) References Cited
U.S. PATENT DOCUMENTS 5,440,747 A * 8/1995 Kiuchi ........................ 710/267
5,790,876 A * 8/1998 Shima et al. ................. 713/320
6,131,167 A * 10/2000 Cruz ........................... 713/320
6,282,665 B1 * 8/2001 Cruz ........................... 713/320

* cited by examiner

*Primary Examiner*—Mark Zimmerman
*Assistant Examiner*—Vu B Hang
(74) *Attorney, Agent, or Firm*—Fitzpatrick, Cella, Harper & Scinto

(57) ABSTRACT

A device of this invention solely executes a power saving operation without influencing a repeater operation on a serial bus interface to which a plurality of devices are cascade-connected.

A device such as a digital camera, printer, or the like, which is cascade-connected using an IEEE1394 serial bus interface, uses an IC prepared by forming both physical and link layers on a single chip. This IC has a port connected to a bus. When a power supply on the bus side is OFF, this port can insulate the bus in DC term. This device transits to a power saving mode such as a sleep mode, suspend mode, shutdown mode, or the like after an elapse of a predetermined wait time. In the shutdown mode, the system power supply of the device is turned off, but the IC can operate by electric power supplied from a cable. With this operation, a signal can be relayed between devices, and a packet for the link layer can be received. Upon receiving a LINK_ON packet, the device is restored from the power saving mode to a normal drive state.

5 Claims, 32 Drawing Sheets

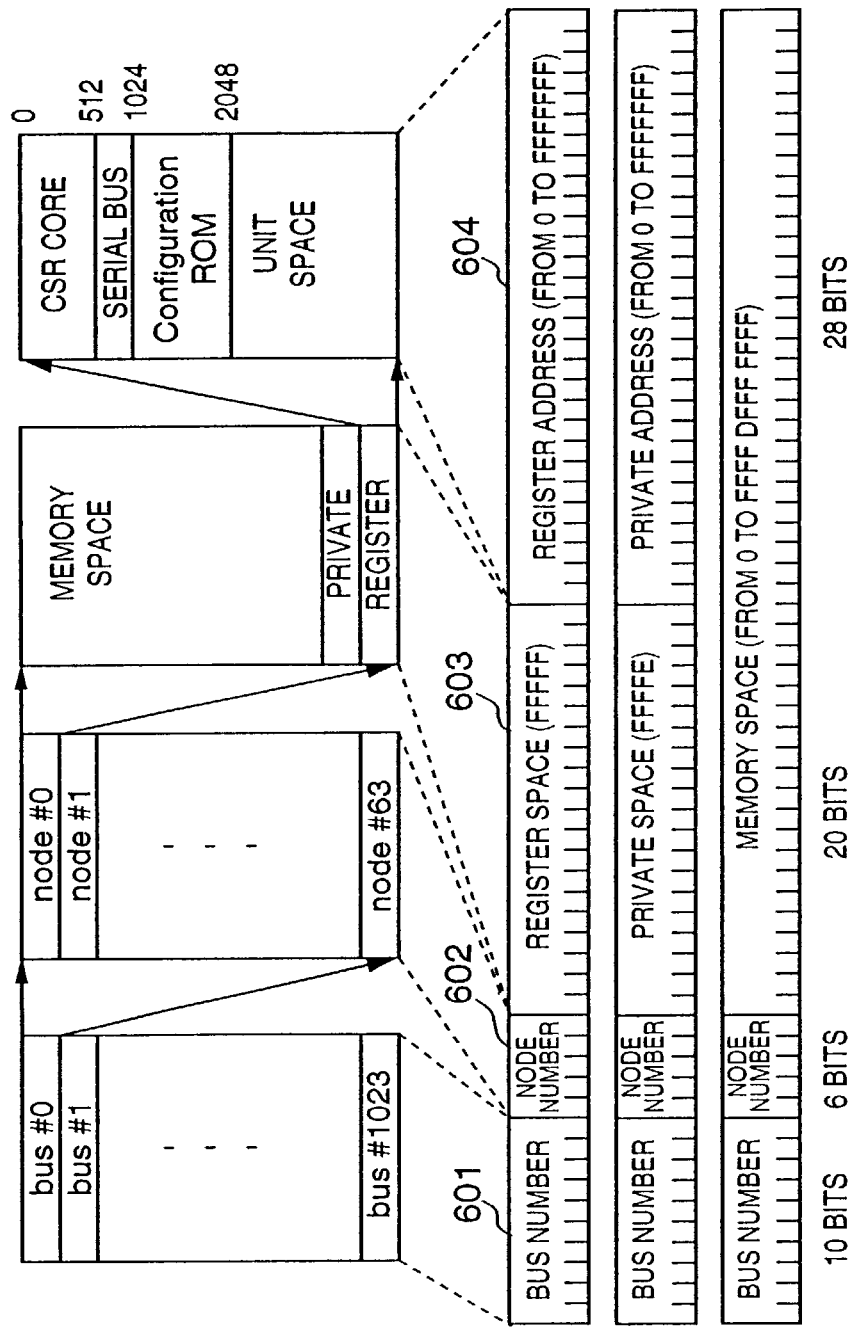

FIG. 7
CSR CORE REGISTER

| OFFSET (HEXADECIMAL) | REGISTER NAME | FUNCTION |
|---|---|---|
| 000 | STATE_CLEAR | INFORMATION OF STATUS AND CONTROL |
| 004 | STATE_SET | INFORMATION INDICATING WRITE ENABLE/DISABLE OF STATE_CLEAR |
| 008 | NODE_IDS | BUS ID + NODE ID |
| 00C | RESET_START | RESET BUS BY WRITE IN THIS AREA |
| 010~014 | INDIRECT_ADDRESS, INDIRECT_DATA | REGISTER FOR ACCESSING ROM LARGER THAN 1K |
| 018~01C | SPLIT_TIMEOUT | VALUE OF TIMER FOR DETECTING TIME-OUT OF SPLIT TRANSACTION |
| 020~02C | ARGUMENT, TEST_START, TEST_STATUS | DIAGNOSTIC REGISTER |
| 030~04C | UNITS_BASE, UNITS_BOUND, MEMORY_BASE, MEMORY_BOUND | NOT IMPLEMENTED IN IEEE1394 |
| 050~054 | INTERRUPT_TARGET, INTERRUPT_MASK | INTERRUPT INDICATION REGISTER |
| 058~07C | CLOCK_VALUE, CLOCK_TICK_PERIOD, CLOCK_STROBE_ARRIVED, CLOCK_INFO | NOT IMPLEMENTED IN IEEE1394 |
| 080~0FC | MESSAGE_REQUEST, MESSAGE_RESPONSE | MESSAGE INDICATION REGISTER |
| 100~17C | | RESERVED |
| 180~1FC | ERROR_LOG_BUFFER | RESERVED FOR IEEE1394 |

FIG. 8
SERIAL BUS REGISTER

| OFFSET (HEXADECIMAL) | REGISTER NAME | FUNCTION |
|---|---|---|
| 200 | CYCLE_TIME | COUNTER FOR ISOCHRONOUS TRANSFER |
| 204 | BUS_TIME | REGISTER FOR SYNCHRONIZING TIME |
| 208 | POWER_FAIL_IMMINENT | REGISTER ASSOCIATED WITH POWER SUPPLY |
| 20C | POWER_SOURCE | |
| 210 | BUSY_TIMEOUT | CONTROL RETRY OF TRANSACTION LAYER |
| 214~218 | | RESERVED |
| 21C | BUS_MANAGER_ID | NODE ID OF BUS MANAGER |
| 220 | BANDWIDTH_AVAILABLE | MANAGE BANDWIDTH OF ISOCHRONOUS TRANSFER |
| 224~228 | CHANNELS_AVAILABLE | MANAGE CHANNEL NUMBER OF ISOCHRONOUS TRANSFER |
| 22C | MAINT_CONTROL | DIAGNOSTIC REGISTER |
| 230 | MAINT_UTILITY | |
| 234~3FC | | RESERVED |

CONFIGURATION ROM OF MINIMUM FORMAT

FIG. 11

SERIAL BUS DEVICE REGISTER

| OFFSET (HEXADECIMAL) | REGISTER NAME | FUNCTION |
|---|---|---|
| 800~FFC | | RESERVED |
| 1000~13FC | TOPOLOGY_MAP | CONFIGURATION INFORMATION OF SERIAL BUS |
| 1400~1FFC | | RESERVED |
| 2000~2FFC | SPEED_MAP | INFORMATION OF TRANSFER RATE OF SERIAL BUS |
| 3000~FFFC | | RESERVED |

□ : PORT
c : PORT CONNECTED TO PARENT NODE
p : PORT CONNECTED TO CHILD NODE

REQUEST RIGHT TO USE BUS

PERMIT RIGHT TO USE BUS

PACKET OF ISOCHRONOUS DATA

DATA PROCESSING APPARATUS AND POWER CONTROL METHOD

FIELD OF THE INVENTION

This invention relates to a power saving control technique which can reduce the consumption power of a device without influencing another connected device upon exchanging data between devices, which are connected to each other via a communication line, especially, a high-speed serial bus (e.g., a serial interface specified by IEEE1394) that allows cascade connection.

BACKGROUND OF THE INVENTION

Conventionally, upon printing image data sensed by a digital camera using a printer, a method of connecting a personal computer and digital camera using a serial interface such as RS-232C or the like to download image data to the personal computer, a method of directly loading image data to the personal computer using a memory card incorporated in the digital camera, or the like is used. Image data fetched by the personal computer is transferred to a printer, which is connected to that personal computer via a parallel interface such as a Centronics interface or a serial interface, after it undergoes a data process corresponding to the print format of the printer, thus executing a print process.

In recent years, a high-speed serial bus such as a USB (universal serial bus), IEEE1394 (FireWire), or the like is used as a serial interface. To a single high-speed serial bus, a plurality of devices can be cascade-connected in series. When a device, which does not perform data transfer in practice, of a plurality of devices which are cascade-connected to a single serial bus, undergoes power saving control (power management), a physical layer circuit connected to the serial bus must always be active. This is because the cascade-connected devices serve as repeaters, and data cannot be relayed if the physical layer circuits that repeat data are not active all the time.

However, if the power saving control operates only the physical layer circuit of the serial bus in an arbitrary device, but completely shuts down other circuits, the control cannot activate that device if that device receives a data transfer request. For this reason, a device that executes power saving control while waiting for data reception cannot be completely shut down, and a method using a sleep state in which a CPU is ready for startup anytime is adopted. In this way, a device which serves as a relay node cannot undergo power control which shuts down a power supply of that device. Such limitation on power control poses a serious problem in a device such as a portable personal computer, which must strictly execute power control since it does not receive any external power supply and uses a battery as a power supply.

SUMMARY OF THE INVENTION

The present invention has been made in consideration of the aforementioned prior art, and has as its object to provide a data processing apparatus, which can execute power control that sets a shutdown state without influencing a repeater operation, and can be restored from the shutdown state in response to a signal received via a communication like, when it is cascade-connected to a bus, and its power control method.

In order to achieve the above object, the present invention comprises the following arrangement.

In each of respective devices such as a digital camera, printer, and the like, which are cascade-connected using an IEEE1394 serial interface, an IC prepared by forming both a physical layer circuit and link layer circuit on a single chip is used, a shutdown mode that uses a sleep mode and power OFF sequence, and a suspend mode that uses a suspend process sequence are selectively used as power saving control in a device standby state, and restoration from the shutdown state uses a power ON sequence or restoration from the suspend state uses a restoration process sequence using a CPU interrupt upon restart in response to a data transfer request received from another device.

Or a data processing apparatus which is connected to another device via a communication line, comprises:

a system unit having a power saving control function that sets a power saving state by executing power saving control; and an interface unit configured to make a relay operation of the communication line by electric power supplied via the communication line, and to restore the system unit from the power saving state upon receiving a predetermined signal via the communication line.

More preferably, the interface unit has a physical layer circuit and link layer circuit of a communication by the communication line, the physical layer circuit implements the relay operation, and the link layer circuit resumes the system unit from the power saving state upon receiving the predetermined signal.

More preferably, the power saving means executes the power saving control using a sleep mode that lowers a clock rate as one of power saving states.

More preferably, the power saving means executes the power saving control using a suspend mode that halts a clock as one of power saving states.

More preferably, the power saving means executes the power saving control using a shutdown mode that stops power supply to the system unit as one of power saving states.

More preferably, the interface unit controls a communication in accordance with the IEEE1394 serial bus standard.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a view for explaining the address space in the IEEE1394 interface;

FIG. 7 is a table showing the addresses and functions of information stored in a CSR core register;

FIG. 8 is a table showing the addresses and functions of information stored in a serial bus register;

FIG. 11 is a table showing the addresses and functions of information stored in a serial bus device register of a unit space;

DETAILED DESCRIPTION OF THE PREFERRED EMBODIMENTS

First Embodiment

A power saving control method according to the first embodiment of the present invention will be described in detail below with reference to the accompanying drawings.

Figure 1:
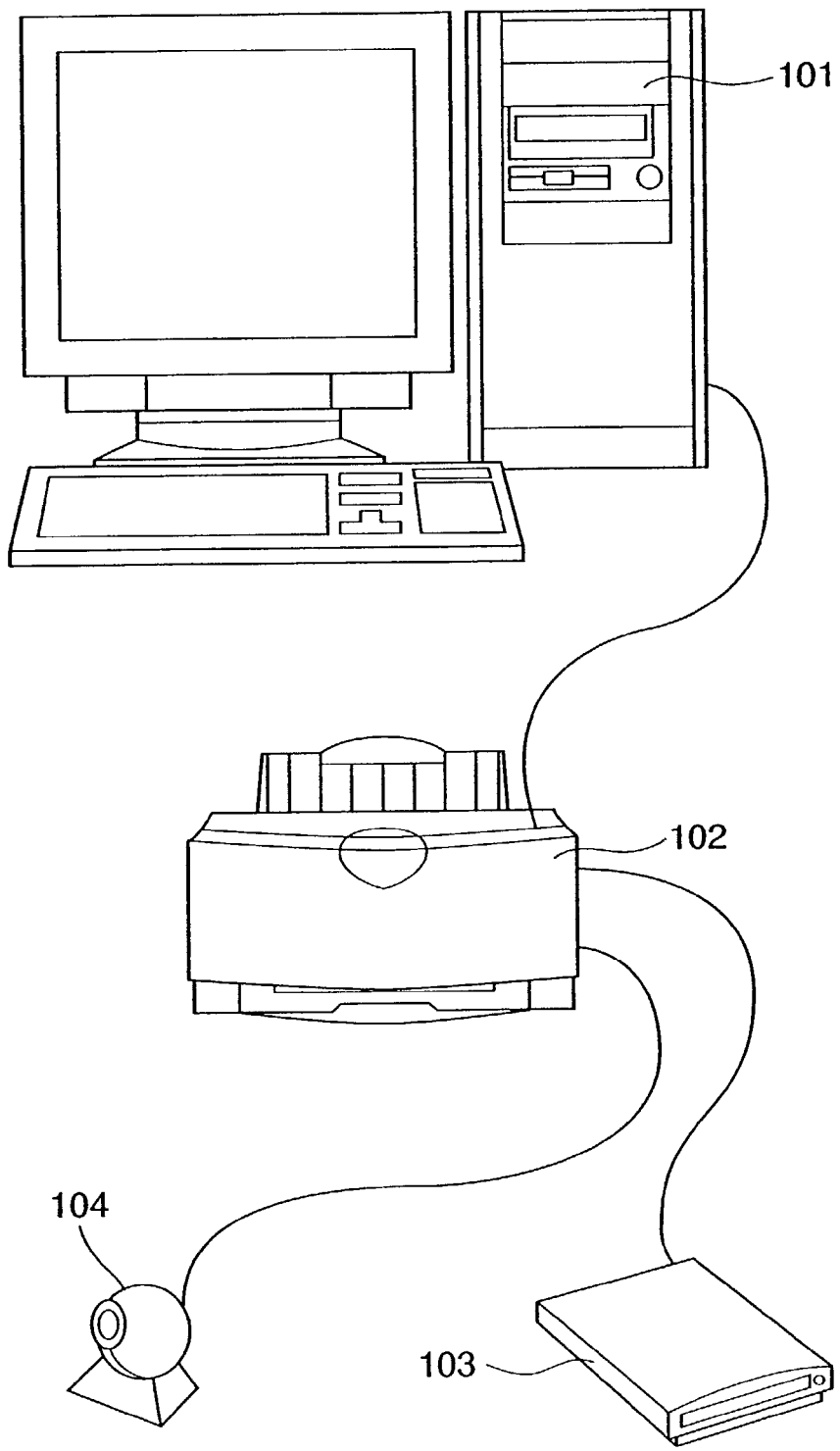
FIG. 1 shows a general connection configuration of a system to which the present invention is applied.

FIG. 1 shows a general connection configuration of a system to which the present invention is applied. In FIG. 1, an ink-jet printer 102 as a print device, a storage device 103 used to save data, and a communication camera 104 as a device for always capturing an image are connected to a personal computer 101 via a serial interface.

In the system of this embodiment, since the serial interface that connects respective devices uses an IEEE1394 interface, an outline of the IEEE1394-1995 standard technology will be explained first. Note that details of the IEEE1394-1995 standard (to be referred to as the IEEE1394 standard hereinafter) are described in "IEEE Standard for a High Performance Serial Bus" published by IEEE (The Institute of Electrical and Electronics Engineers, Inc.) on Aug. 30, 1996.

<Technical Outline of IEEE1394>

(1) Outline

Figure 2:
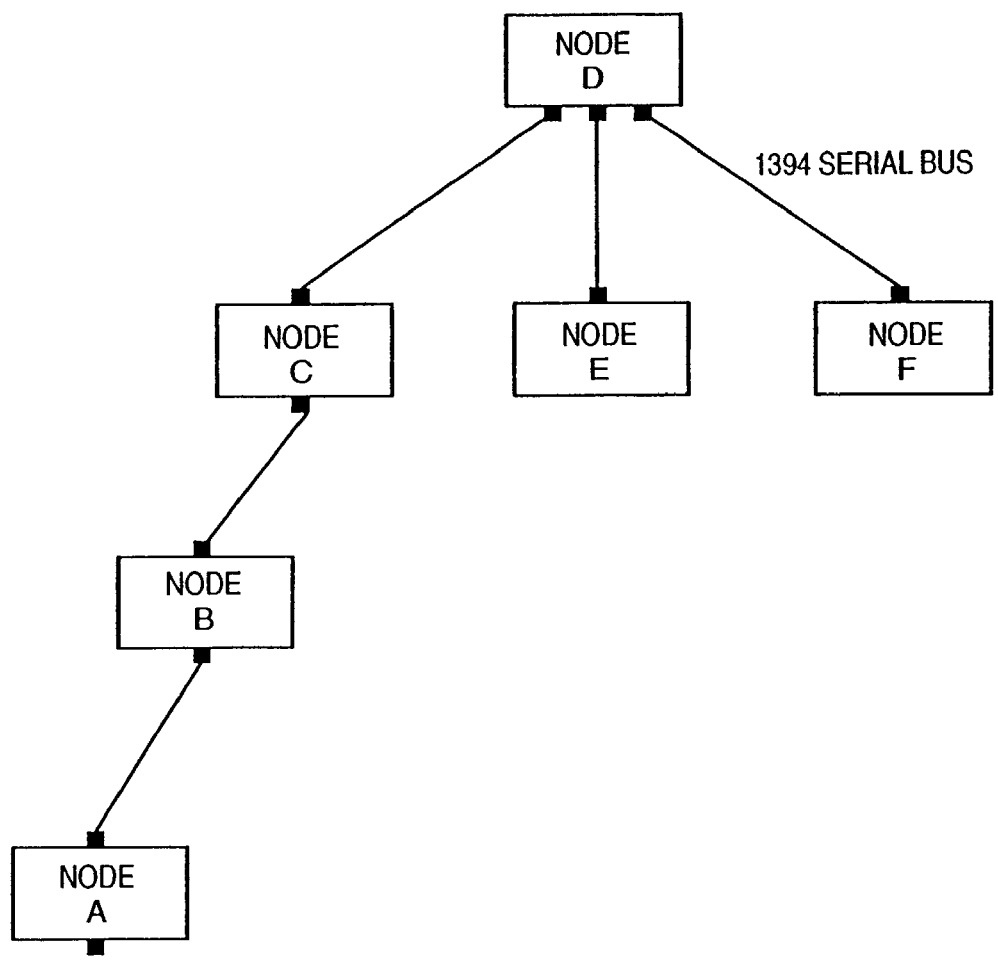
FIG. 2 is a diagram showing the arrangement of a network system connected by IEEE1394.

FIG. 2 shows an example of a communication system (to be referred to as a 1394 network hereinafter) constituted by nodes each comprising a digital interface (to be referred to as a 1394 interface hereinafter) complying with the IEEE1394 standard. The 1394 network forms a bus network that can communicate serial data.

Referring to FIG. 2, nodes A to F are connected via communication cables complying with the IEEE1394 standard. These nodes A to F are, for example, electronic devices such as a PC (Personal Computer), digital VTR (Video Tape Recorder), DVD (Digital Versatile Disc) player, digital camera, hard disk, monitor, and the like.

The connection scheme of the 1394 network includes a daisy-chain scheme and node branch scheme, and has high degree of freedom in connection.

In the 1394 network, for example, when an existing device is removed, a new device is added, or the power switch of an existing device is turned on/off, a bus reset is automatically executed. By executing the bus reset, the 1394 network can automatically recognize a new connection configuration, and can automatically assign ID information to respective devices. With this function, the 1394 network can always recognize the connection configuration of the network.

The 1394 network has a function of relaying data transferred from another device. With this function, all devices can recognize the operation state of the bus.

The 1394 network has a Plug & Play function. With this function, a device can automatically be recognized only upon connecting it without turning off the power switches of all the devices.

The 1394 network is compatible to data transfer rates of 100/200/400 Mbps. Since a device having a higher data transfer rate can support a lower data transfer rate, devices corresponding to different data transfer rates can be connected to each other.

Furthermore, the 1394 network is compatible to two different data transfer modes (i.e., asynchronous transfer mode and isochronous transfer mode).

The asynchronous transfer mode is effective when data is required to be asynchronously transferred as needed (i.e., a control signal, data file, or the like). The isochronous transfer mode is effective when data of a given size is required to be continuously transferred at a constant data rate (i.e., video data, audio data, or the like).

The asynchronous and isochronous transfer modes can mix within one communication cycle (normally, one cycle=125 μs). Each transfer mode is executed after a cycle start packet (to be abbreviated as CSP hereinafter) indicating the start of a cycle is transferred.

Note that the isochronous transfer mode has higher priority than the asynchronous transfer mode during each communication cycle period. The transfer frequency band of the isochronous transfer mode is guaranteed within each communication cycle.

(2) Architecture

The building components of the 1394 interface will be explained below using FIG. 3.

The IEEE1394 interface functionally consists of a plurality of layers. In FIG. 3, the IEEE1394 interface is connected to that of another node via a communication cable 301 complying with the IEEE1394 standard. The IEEE1394 interface has at least one communication port 302, which is connected to a physical layer 303 included in a hardware block.

Figure 3:
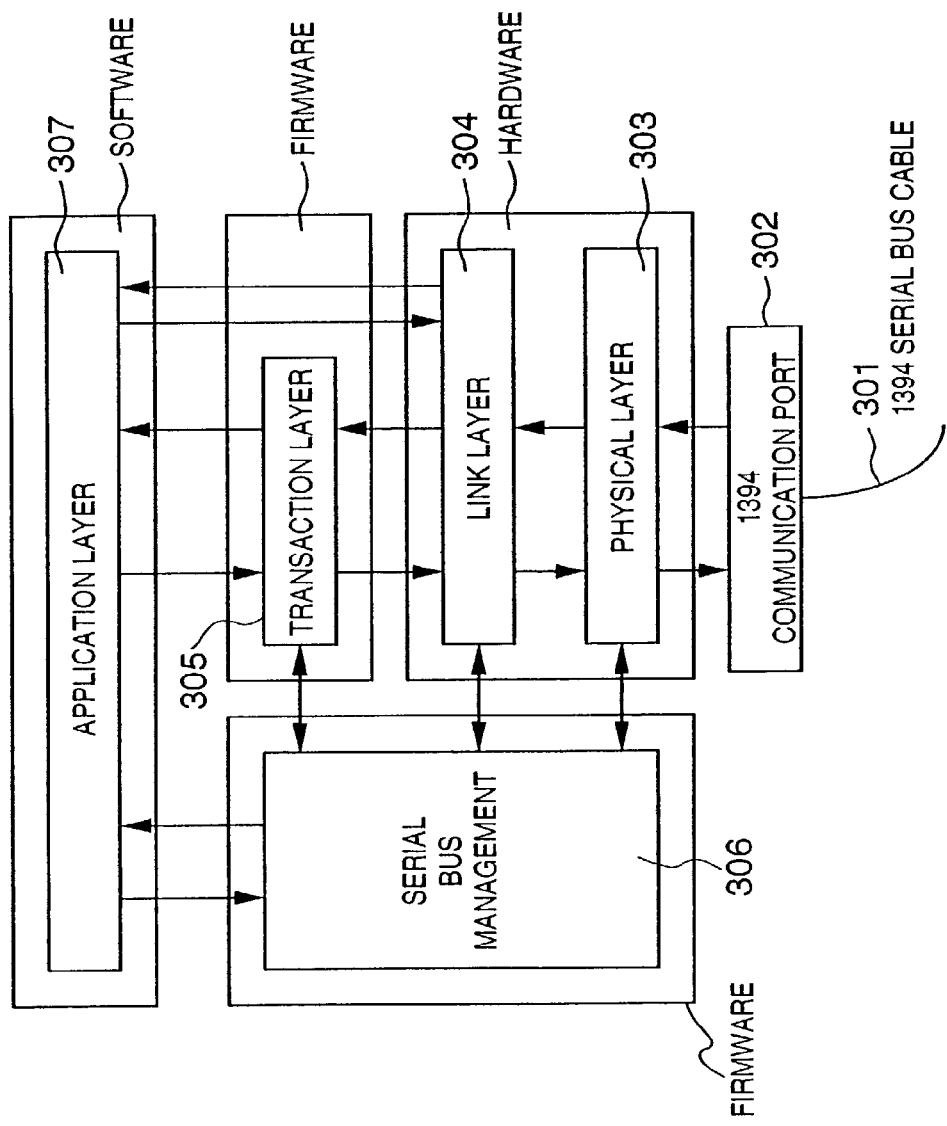
FIG. 3 is a diagram showing the building components of an IEEE1394 interface.

In FIG. 3, the hardware block comprises the physical layer 303 and link layer 304. The physical layer 303 attains physical/electrical interfaces with another node, detection of a bus reset, a process executed upon detection of the bus reset, encoding/decoding of input/output signals, arbitration of the right to use a bus, and the like. The link layer 304 performs generation and exchange of communication packets, control of a cycle timer, and the like.

In FIG. 3, a firmware block includes a transaction layer 305 and serial bus management 306. The transaction layer 305 manages the asynchronous transfer mode to provide various transactions (read, write, lock). The serial bus management 306 provides a function of performing control of the self node, management of the connection state of the self node, management of ID information of the self node, resource management of the serial bus network, and the like on the basis of a CSR architecture (to be described later).

The aforementioned hardware and firmware blocks essentially configure the 1394 interface. Note that this basic configuration is specified by the IEEE1394 standard.

Note that an application layer 307 included in a software block differs depending on the application software used, and controls data communications on the network. For example, in case of moving image data of a digital VTR, the application layer is specified by a communication protocol such as the AV/C protocol or the like.

(2-1) Link Layer 304

Figure 4:
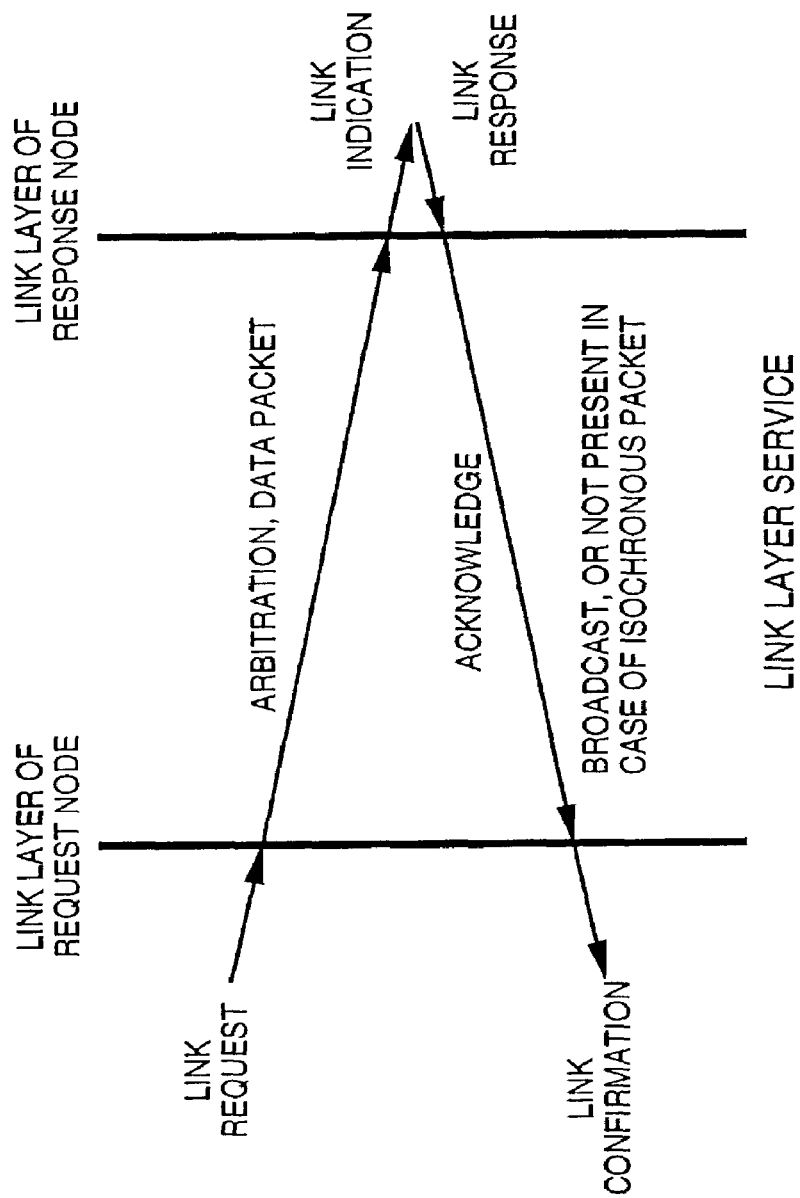
FIG. 4 shows services that a link layer 304 can provide.

FIG. 4 shows services that the link layer 304 can provide. In FIG. 4, the link layer 304 provides the following four services: (1) a link request that requests transfer of a predetermined packet of a response node (LK_DATA.request), (2) a link indication that informs a response node of reception of a predetermined packet (LK_DATA.indication), (3) a link response which indicates that an acknowledge from a response node is received (LK_DATA.response), and (4) a link confirmation which confirms an acknowledge from a request node (LK_DATA.confirmation). Note that no link response (LK_DATA.response) is present in case of broadcast communications and transfer of isochronous packets.

The link layer 304 implements the aforementioned two different transfer modes, i.e., the asynchronous and isochronous transfer modes on the basis of the aforementioned services.

(2-2) Transaction Layer 305

Figure 5:
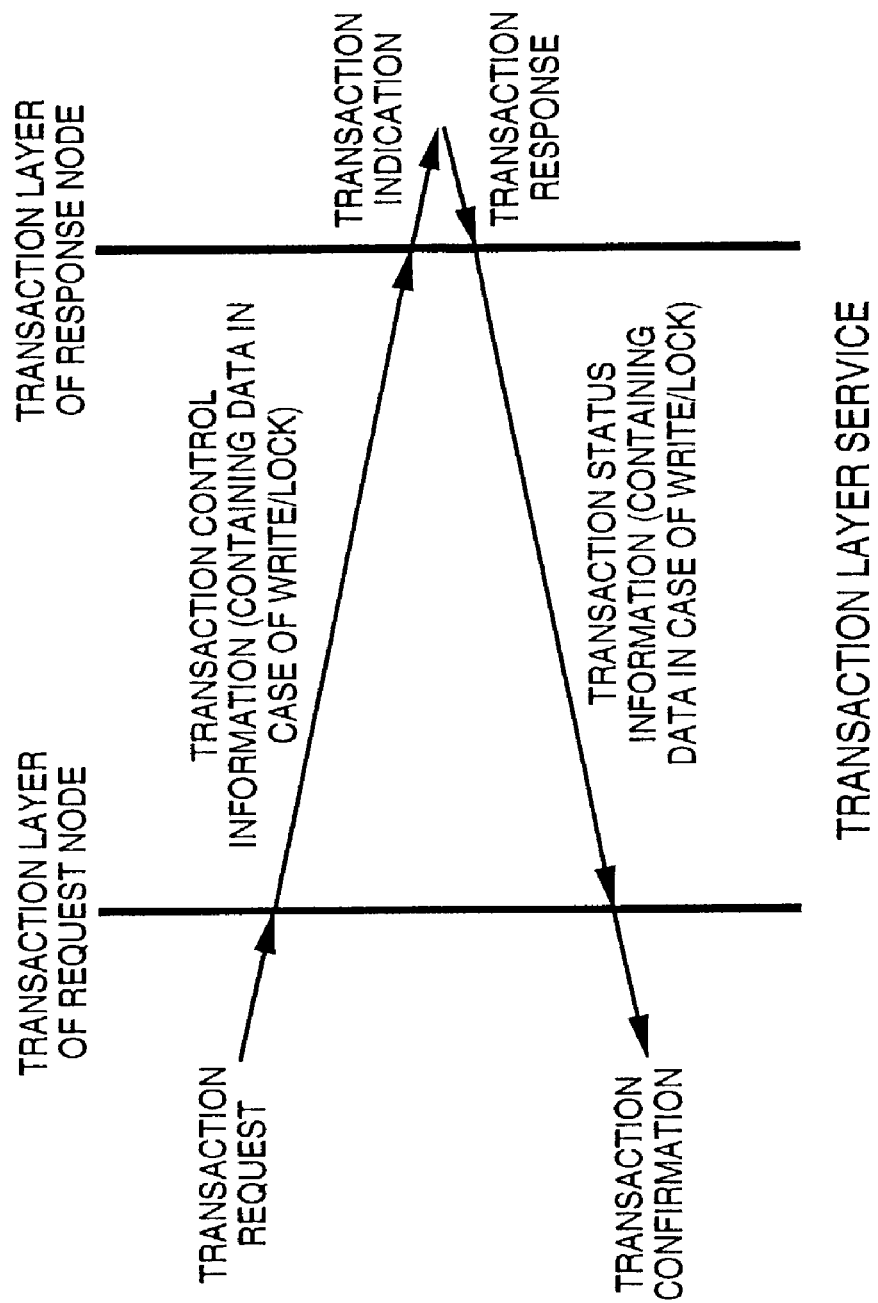
FIG. 5 shows services that a transaction layer 305 can provide.

FIG. 5 shows services that the transaction layer 305 can provide. In FIG. 5, the transaction layer 305 provides the following four services: (1) a transaction request that requests a predetermined transaction of a response node (TR_DATA.request), (2) a transaction indication that informs a response node of reception of a predetermined transaction request (TR_DATA.indication), (3) a transaction response indicating that status information (containing data in case of write/lock) has been received from a response node (TR_DATA.response), and (4) a transaction confirmation that confirms status information from a request node (TR_DATA.confirmation).

The transaction layer 305 manages the asynchronous transfer mode on the basis of the aforementioned services, and implements the following three different transactions, i.e., (1) read transaction, (2) write transaction, and (3) lock transaction.

In read transaction (1), a request node reads information stored at a specific address of a response node.

In write transaction (2), a request node writes predetermined information at a specific address of a response node.

In lock transaction (3), a request node transfers reference data and update data to a response node, compares the reference data with information at a specific address of the response node, and updates the information at the specific address with the update data in accordance with the comparison result.

(2-3) Serial Bus Management 306

The serial bus management 306 can provide the following three functions: (1) node control, (2) an isochronous resource manager (to be abbreviated as IRM hereinafter), and (3) a bus manager.

Node control (1) provides a function of managing the aforementioned layers to manage asynchronous transfer executed with another node.

IRM (2) provides a function of managing isochronous transfer executed with another node. More specifically, the IRM manages information required to assign the transfer band width and channel number, and provides such information to another node. Only one IRM is present on the local bus, and is dynamically selected from candidates (nodes having the IRM function) every bus reset. The IRM may provide some of functions (management of the connection configuration, power supply management, management of rate information, and the like) that the bus manager (to be described below) can provide.

Bus manager (3) has the IRM function, and provides higher-level bus management functions than the IRM. More specifically, the bus manager has functions of performing higher-level power supply management (that manages information indicating whether or not electric power can be supplied via a communication cable, whether or not power supply is required, and so forth for respective nodes), higher-level management of rate information (that manages the maximum transfer rate among nodes), higher-level management of the connection configuration (that generates a topology map), optimization of a bus based on such management information, and the like, and providing such information to another node. Also, the bus manager can provide services for controlling a serial bus network to an application. Note that the services include a serial bus control request (SB_CONTROL.request), serial bus event control confirmation (SB_CONTROL.confirmation), serial bus event indication (SB_CONTROL.indication), and the like. SB_CONTROL.request is a service that allows an application to request to trigger a bus reset. SB_CONTROL.confirmation is a service that confirms SB_CONTROL.request with respect to an application. SB_CONTROL.indication is a service that informs an application of an event that occurs asynchronously.

(3) Address Designation

FIG. 6 is a view for explaining the address space in the 1394 interface. Note that the 1394 interface specifies a 64-bit wide address space according to the CSR (Command and Status Register) architecture complying with ISO/IEC13213:1994.

In FIG. 6, the first 10-bit field 601 is used to store an ID number for designating a predetermined bus, and the next 6-bit field 602 is used to store an ID number for designating a predetermined device (node). These upper 16 bits are called a "node ID", and each node identifies another node on the basis of this node ID. Each node can make communications while identifying a partner node using this node ID.

A field consisting of the remaining 48 bits designates an address space (256-Mbyte structure) of each node. A 20-bit field 603 of these bits designates a plurality of areas which form the address space.

In the field 603, a space "0 to 0xFFFFD" is called a memory space. A space "0xFFFFE" is called a private space that each node can freely use. Also, a space "0xFFFFE" is called a register space which stores information common to nodes connected to the bus. Each node can manage inter-node communications using information in the register space.

The last 28-bit field 604 designates an address where information common or unique to each node is stored.

For example, in the register space, the first 512bytes are used for a core (CSR core) register of the CSR architecture. FIG. 7 shows the addresses and functions of information stored in the CSR core register. Offsets in FIG. 7 indicate relative positions from "0xFFFFF0000000".

The next 512 bytes in FIG. 6 are used for a serial bus register. FIG. 8 shows the addresses and functions of information stored in the serial bus register. Offsets in FIG. 8 indicate relative positions from "0xFFFFF0000200".

The next 1024 bytes in FIG. 6 are used for a configuration ROM.

Figure 9:
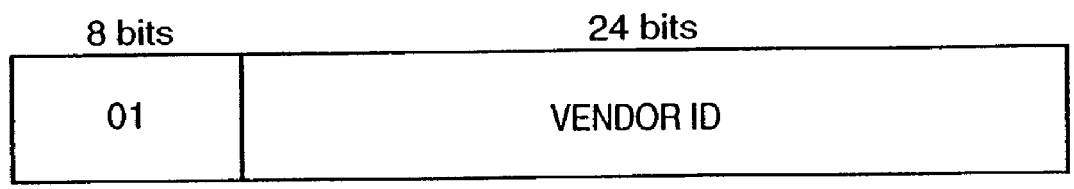
FIG. 9 shows the minimal format of a configuration ROM.

The configuration ROM has a minimal format or general format, and is allocated from "0xFFFFF0000400". FIG. 9 shows an example of the minimal format of the configuration ROM. In FIG. 9, a vendor ID is a 24-bit numerical value uniquely assigned to each vendor.

Figure 10:
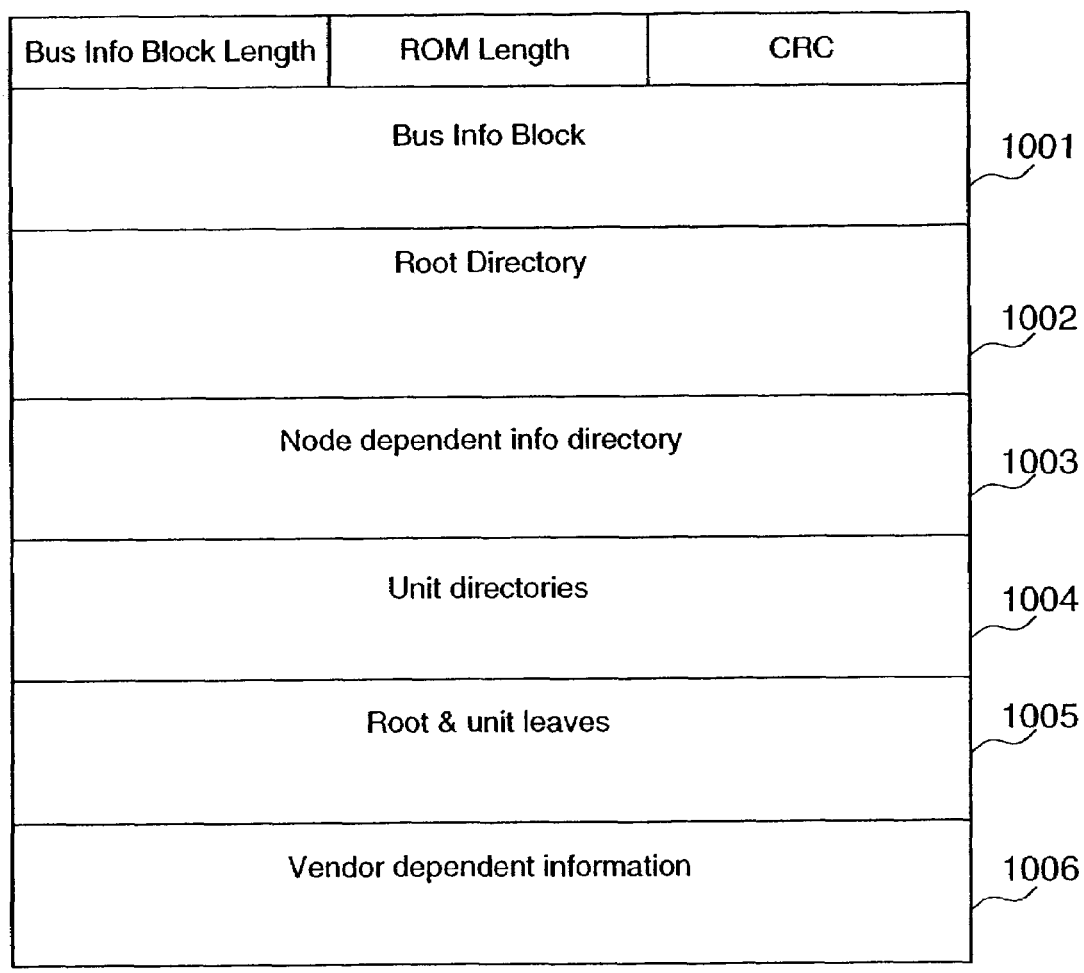
FIG. 10 shows the general format of a configuration ROM.

FIG. 10 shows an example of the general format of the configuration ROM. In FIG. 10, the aforementioned vendor ID is stored in a root directory 1002. A bus info block 1001 and root leaf 1005 can hold a node unique ID as unique ID information that identifies each node.

Note that the node unique ID specifies a unique ID that can specify one node independently of the manufacturers and models. The node unique ID consists of 64 bits, the upper 24 bits of which indicate the aforementioned vendor ID, and the lower 48 bits of which indicate information (e.g., the manufacture number of the node or the like) that the manufacturer of each node can freely set. Note that the node unique ID is used to successively recognize a specific node before and after a bus reset.

In FIG. 10, the root directory 1002 can hold information which pertains to the basic functions of the node. Details of the function information are stored in subdirectories (unit directories 1004) offset from the root directory 1002. The unit directories 1004 store information which pertains to software units that the node supports. More specifically, information that pertains to a data transfer protocol used to make a data communication between nodes, a command set which defines a predetermined communication procedure, and the like is held.

Also, in FIG. 10, a node dependent info directory 1003 can hold information unique to a device. The node dependent info directory 1003 is offset by the root directory 1002.

Furthermore, in FIG. 10, vendor dependent information 1006 can hold information unique to a vendor which manufactured or vended the node.

The remaining area is called a unit space, which designates an address where information unique to each node, for example, identification information (company name, model name, or the like) of each device, a use condition, or the like is stored. FIG. 11 shows the addresses and functions of information stored in a serial bus device register of the unit space. Offsets in FIG. 11 indicate relative positions from "0xFFFFF0000800".

Note that each node should use the first 2048 bytes of the register space to simplify the design of disparate bus systems. That is, the register space is preferably made up of the CSR core register, serial bus register, configuration ROM, and the first 2048 bytes of the unit space, i.e., a total of 4096 bytes.

(4) Structure of Communication Cable

Figure 12:
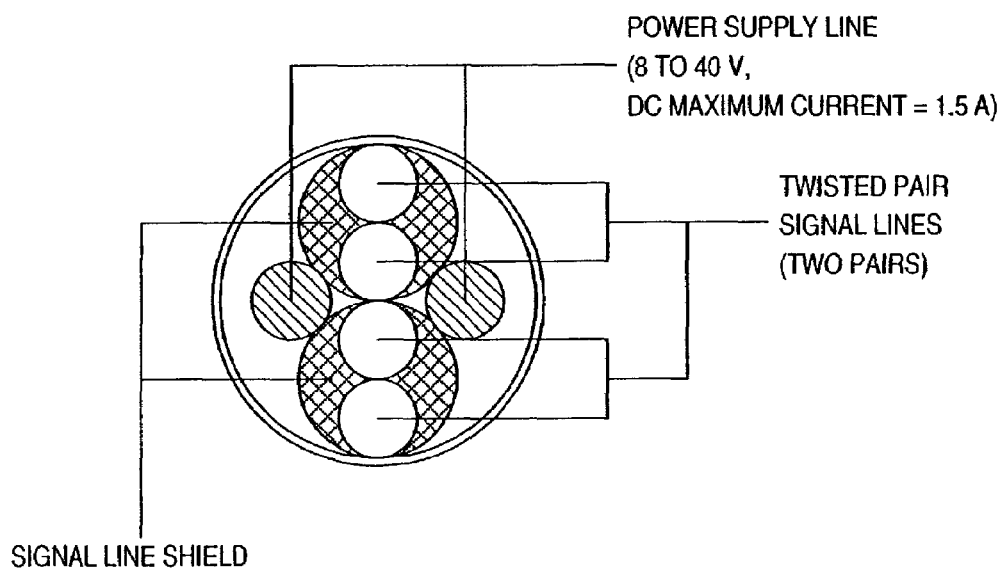
FIG. 12 is a sectional view of a communication cable complying with IEEE1394.

FIG. 12 is a sectional view of a communication cable complying with the IEEE1394 standard.

The communication cable is comprised of two pairs of twisted pair signal lines, and power supply lines. By providing the power supply lines, the 1394 interface can supply electric power even to a device the main power supply of which is OFF, a device whose electric power has dropped due to some failure, and the like. Note that the power supply voltage flowing in the power supply line is specified to fall within the range of 8 to 40 V, and the maximum current is specified to be DC 1.5 A.

Figure 13:
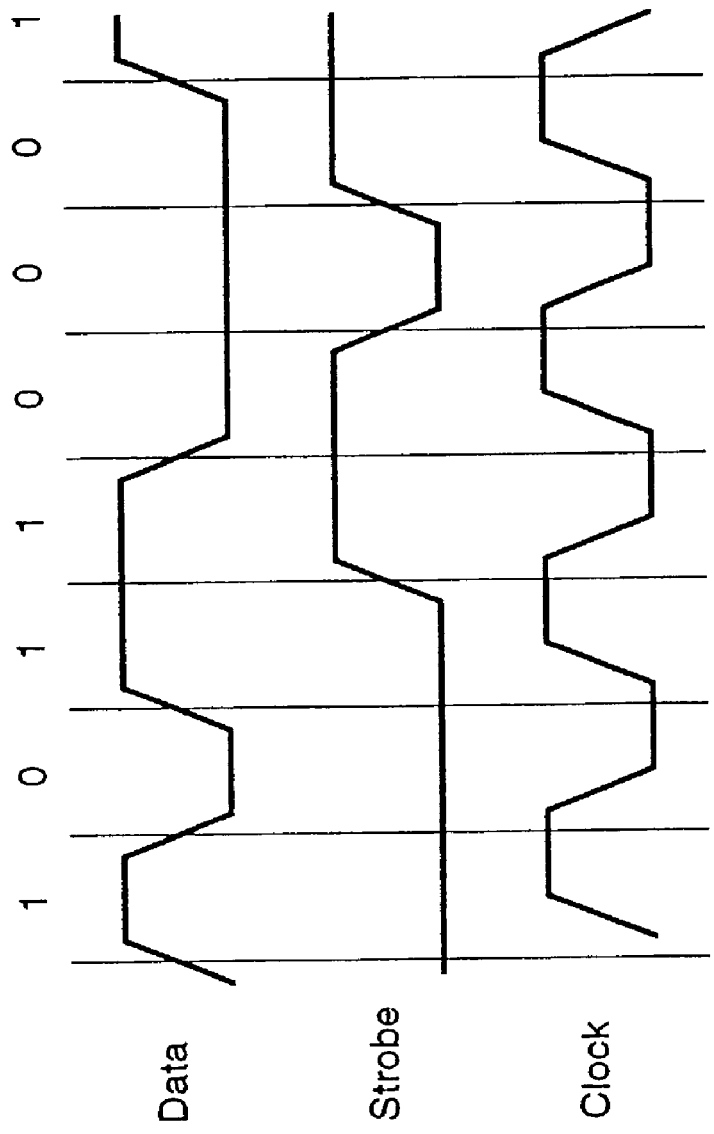
FIG. 13 is a chart for explaining a DS-link encoding scheme.

The two pairs of twisted pair signal lines transfer information signals encoded by the DS-Link (Data/Strobe Link) encoding scheme. FIG. 13 is a chart for explaining the DS-Link encoding scheme.

The DS-Link encoding scheme is suitable for high-speed serial data communications, and requires two pairs of twisted pair lines. One pair of twisted pair lines send a data signal, and the other pair of twisted pair lines send a strobe signal. The receiving side can reclaim clocks by EX-ORing the data and strobe signals received from the two pairs of signal lines.

Using the DS-Link encoding scheme, the 1394 interface can obtain the following merits: (1) the transfer efficiency is higher than other encoding schemes; (2) the need for a PLL circuit can be obviated to reduce the circuit scale of a controller LSI; and (3) since no information indicating an idle state need be sent, a transceiver circuit can be easily set in a sleep state to reduce consumption power.

(5) Bus Reset

The 1394 interface of each node can automatically detect a change in connection configuration of the network. In this case, the 1394 network executes a process called a bus reset in the following procedure. Note that the change in connection configuration can be detected by a change in bias voltage applied to the communication port of each node.

A node that has detected a change in connection configuration of the network (e.g., an increase/decrease in the number of nodes due to insertion/removal of a node, the power ON/OFF of a node, or the like), or a node that must recognize a new connection configuration outputs a bus reset signal onto the bus via the 1394 interface.

The 1394 interface of a node that received the bus reset signal reports generation of a bus reset to its own link layer 304, and transfers that bus reset signal to another node. Upon receiving the bus reset signal, the other node clears the connection configuration of the network recognized so far, and node IDs assigned to the respective devices. After all the nodes detect the bus reset signal, each node automatically executes an initialization process (i.e., recognition of a new connection configuration and assignment of new node IDs) upon bus reset.

Note that the bus reset can be launched when the application layer 307 directly issues a command to the physical layer 303 under the control of the host, in addition to detection of the change in connection configuration.

Upon launching the bus reset, data transfer is temporarily interrupted, and is restarted under a new network after the end of the initialization process upon bus reset.

(6) Sequence After Bus Reset is Launched

After a bus reset is launched, the 1394 interface of each node automatically recognizes a new connection configuration, and assigns new node IDs. The basic sequence from the beginning of the bus reset until assignment of node IDs will be explained below using FIGS. 14 to 16.

Figure 14:
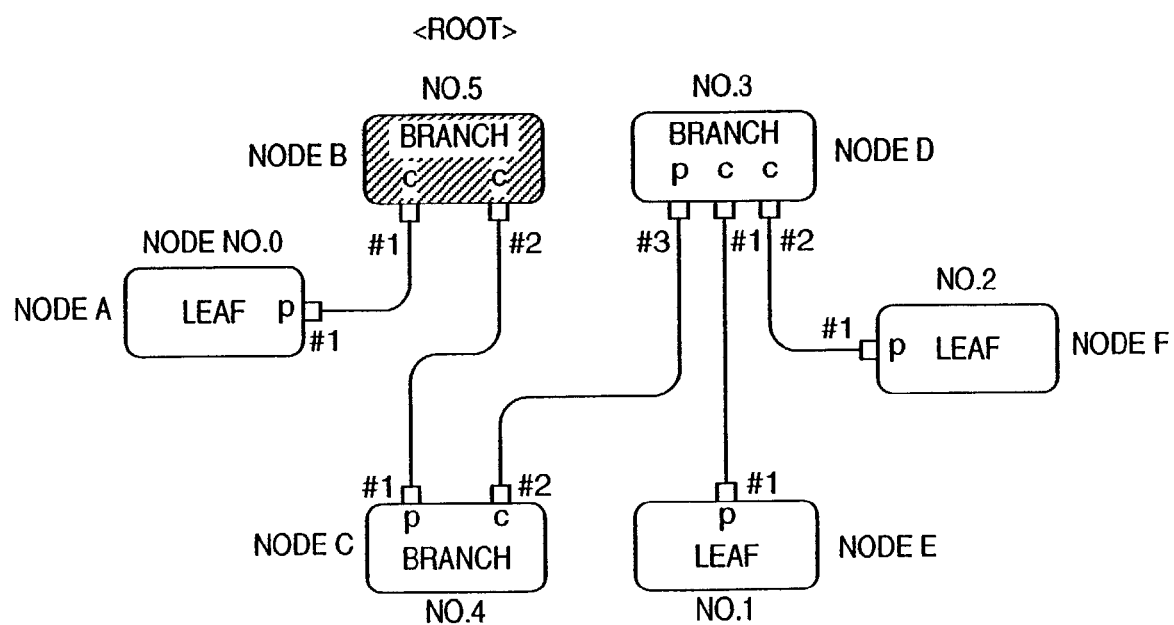
FIG. 14 is a diagram for explaining the state after a bus reset is launched in the IEEE1394 network in FIG. 2.

FIG. 14 is a view for explaining the state after the bus reset is launched in the 1394 network shown in FIG. 2.

Referring to FIG. 14, node A comprises one communication port; node B two ports; node C two ports; node D three ports; node E one port; and node F one port. The communication ports of those nodes are assigned port numbers to identify these ports.

The sequence from the beginning of the bus reset until assignment of node IDs in FIG. 14 will be described below with reference to the flow chart in FIG. 15.

Figure 15:
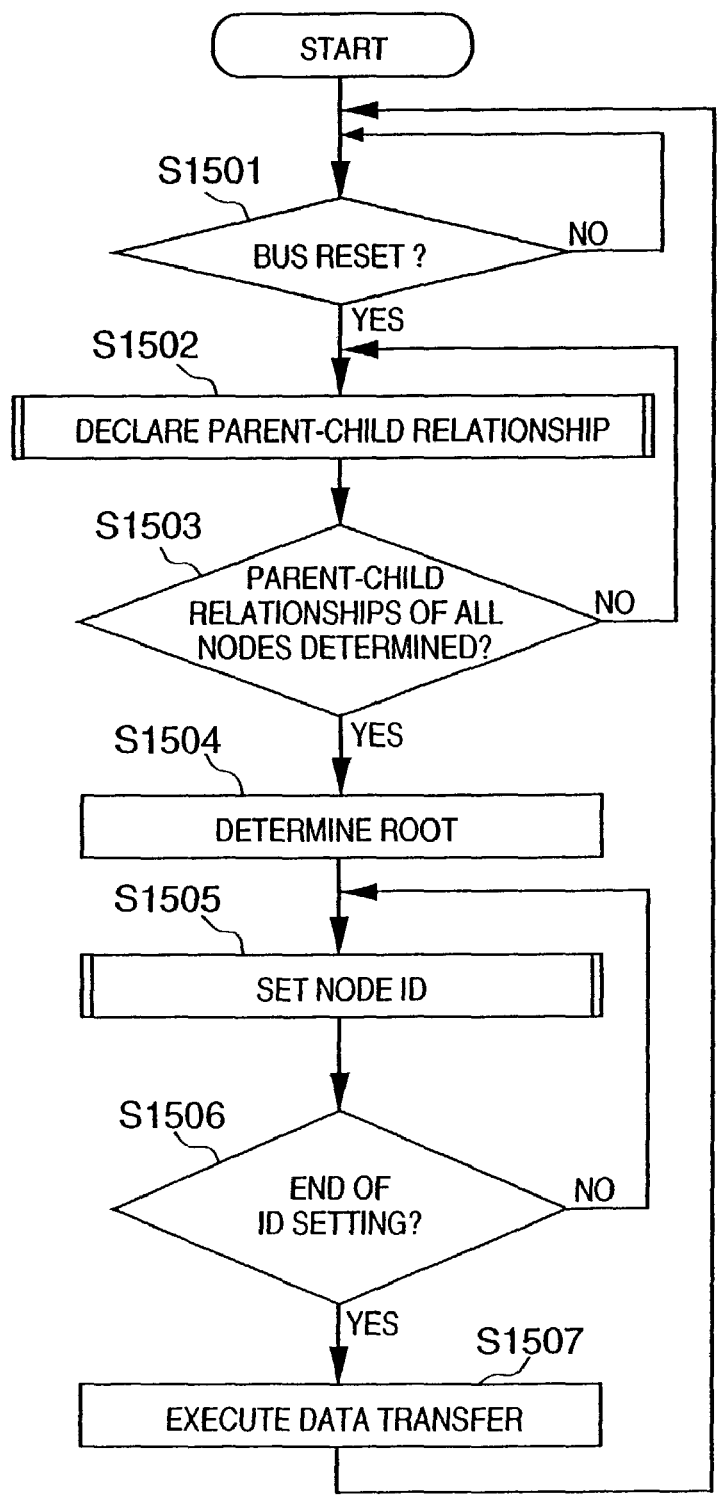
FIG. 15 is a flow chart showing processes from the beginning of the bus reset until assignment of node IDs.

Referring to FIG. 15, nodes A to F, which form the 1394 network, always monitor if a bus reset has occurred (step S1501). When a node that detected a change in connection configuration outputs a bus reset signal, each node executes the following processes.

After the bus reset has occurred, the respective nodes declare parent-child relationships among their communication ports (step S1502).

Each node repeats the process in step S1502 until the parent-child relationships are determined among all the nodes (step S1503).

After the parent-child relationships are determined among all the nodes, the 1394 network determines a node that arbitrates the network, i.e., a root (step S1504).

After the root is determined, the 1394 interface of each node executes a process for automatically setting the self node ID (step S1505).

Each node executes the process in step S1505 based on a predetermined procedure until the node IDs are set for all the nodes (step S1506).

After the node IDs are finally set for all the nodes, each node executes isochronous or asynchronous transfer (step S1507).

The process in step S1507 is executed, and the 1394 interface of each node monitors occurrence of a bus reset again. If the bus reset has occurred, the processes in step S1501 and subsequent steps are executed again.

With the aforementioned sequence, the 1394 interface of each node can automatically recognize a new connection configuration and assign new node IDs every time a bus reset is launched.

(7) Determination of Parent-child Relationship

Details of the process in step S1502 in FIG. 15 (i.e., a process for recognizing the parent-child relationships among nodes) will be described below using FIG. 16.

Figure 16:
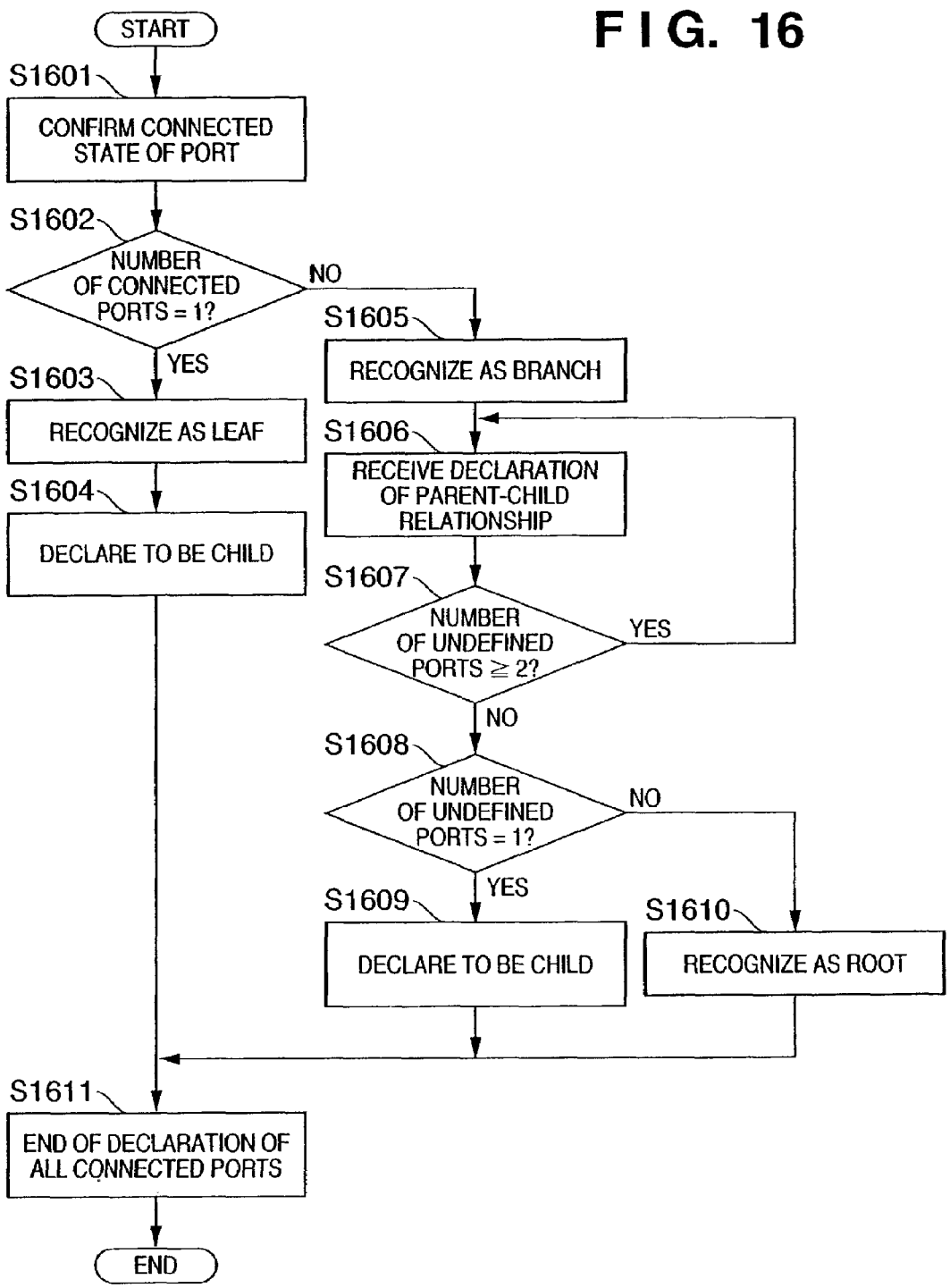
FIG. 16 is a flow chart for explaining the process in step S1502 shown in FIG. 15 (i.e., a process for recognizing the parent-child relationship between nodes) in detail.

In FIG. 16, after a bus reset has occurred, nodes A to F on the 1394 network confirm the connection states (connected or non-connected) of their communication ports (step S1601).

After the connection states of the communication ports are confirmed, each node counts the number of communication ports connected to other nodes (to be referred to as connected ports hereinafter) (step S1602).

If it is determined as a result of the process in step S1602 that the number of connected ports is one, that node recognizes that the self node is a "leaf" (step S1603). Note that a "leaf" is a node which is connected to only one node.

A "leaf" node declares itself to be a "child" for a node connected to its connected port (step S1604). At this time, the leaf recognizes that its connected port is a "parent port (communication port connected to a parent node)".

Note that the parent-child relationship is declared first between the leaf as the end of the network and a branch, and is then declared in turn between branches. The parent-child relationships among nodes are determined in turn from a communication port that can declare earlier. The communication port of a node that has declared itself to be a "child" is recognized as a "parent port", and a communication port that has received that declaration is recognized as a "child port (a communication port connected to a child node)". For example, in FIG. 14, after each of nodes A, E, and F recognizes that the self node is a leaf, they declare a parent-child relationship. In this manner, nodes A and B, nodes E and D, and nodes F and D are respectively determined to be a child and parent.

On the other hand, if it is determined as a result of the process in step S1602 that the number of connected ports is two or more, that node recognizes that the self node is a "branch" (step S1605). Note that the "branch" is a node which is connected to two or more nodes.

A "branch" node receives declarations of parent-child relationships from nodes connected to its connected ports (step S1606). The connected port that received the declaration is recognized as a "child port".

After one connected port is recognized as a "child port", the branch detects if there are two or more connected ports for which a parent-child relationship is not determined yet (i.e., undefined ports) (step S1607). As a result, if there are two or more undefined ports, the branch repeats the process in step S1606.

If it is determined as a result of step S1607 that there is only one undefined port, the branch recognizes that the undefined port is a "parent port", and declares itself to be a "child" for a node connected to that port (steps S1608 and S1609).

Note that a branch cannot declare itself to be a child for another node until the number of remaining undefined ports becomes 1. For example, in FIG. 14, each of nodes B, C, and D recognizes that the self node is a branch, and receives declaration from a leaf or another branch. Node D declares a parent-child relationship for node C after parent-child relationships are determined between D and E and between D and F. Node C that received the declaration from node D declares a parent-child relationship for node B.

On the other hand, if no undefined port remains as a result of the process in step S1608 (i.e., if all connected ports of the branch become parent ports), that branch recognizes that the self node is a root (step S1610).

For example, in FIG. 14, node B, all the connected ports of which have become parent ports, is recognized by other nodes to be a root for arbitrating communications on the 1394 network. In this case, node B is determined as a root. However, when the declaring timing of a parent-child relationship by node B is earlier than that of node C, another node may become a root. That is, every node may become a root depending on the declaring timing. Hence, a given node does not always become a root even in a fixed network configuration.

In this way, after the parent-child relationships are declared among all connected ports, each node can recognize the connection configuration of the 1394 network as a hierarchical structure (tree structure) (step S1611). Note that the aforementioned parent node is a high-level node in the hierarchical structure, and the child node is a low-level node.

(8) Assignment of Node ID

Figure 17:
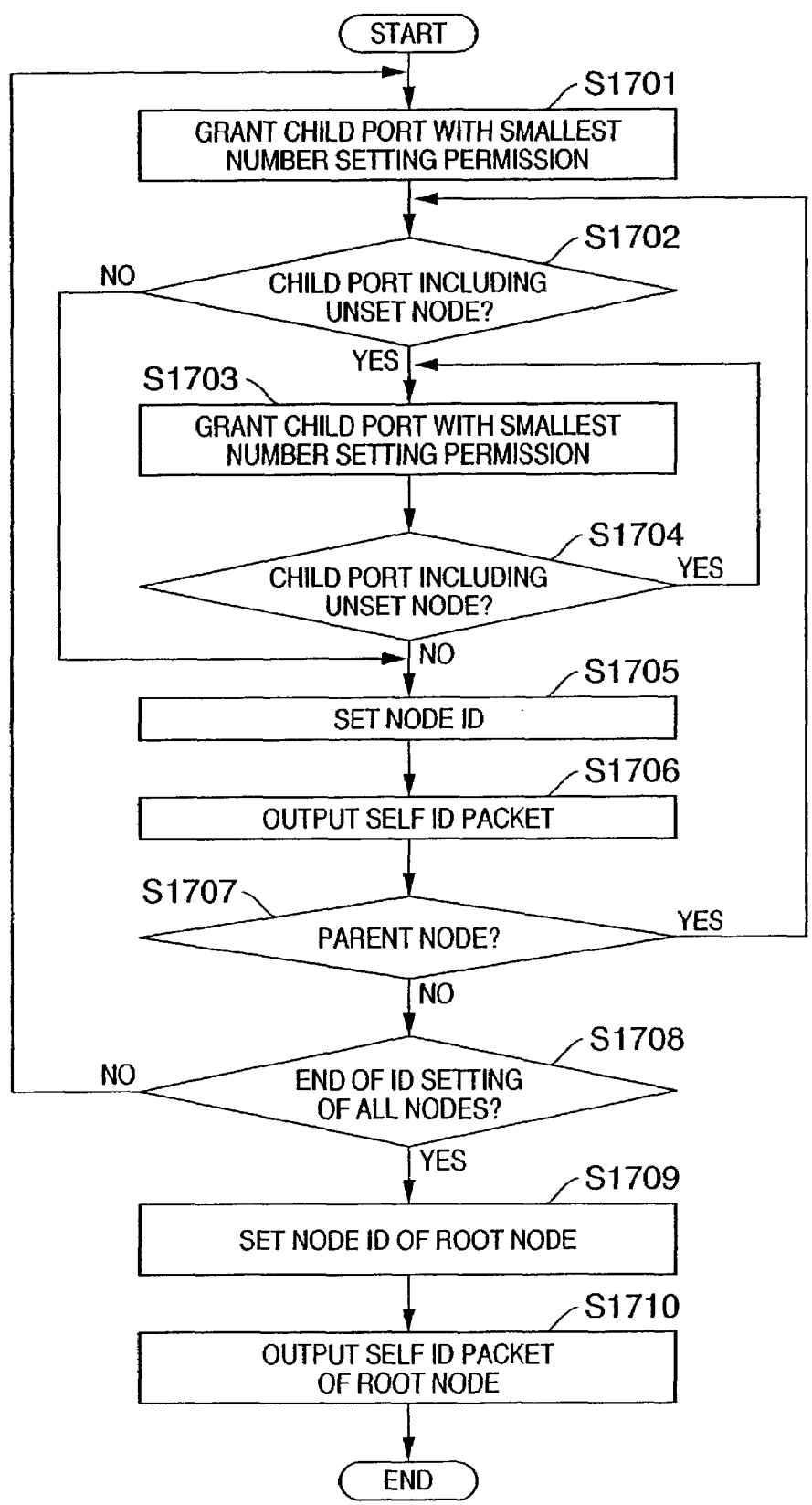
FIG. 17 is a flow chart for explaining the process in step S1505 shown in FIG. 15 (i.e., a process for automatically assigning a node ID of each node) in detail.

FIG. 17 is a flow chart showing details of the process in step S1505 in FIG. 15 (i.e., a process for automatically assigning node IDs of the respective nodes). Note that the node ID is defined by a bus number and node number. In this embodiment, assume that the respective nodes are connected to a single bus, and an identical bus number is assigned to those nodes.

Referring to FIG. 17, the root grants a communication port having a smallest number of child ports, to which nodes, the node IDs of which are not set yet, are connected, a node ID setting permission (step S1701).

In FIG. 17, the root sets the node IDs of all nodes connected to a child port with the smallest number, then determines that child port to be an already set port, and executes similar control for a child port with the next smallest number. After the node IDs of all the nodes connected to the child ports are set, the root sets the self node ID. The node number contained in the node ID is basically assigned like 0, 1, 2, . . . in the order of leaves and branches. Hence, the root has the largest node number.

The node granted the setting permission in step S1701 checks if its child ports include nodes for which node IDs are not set yet (step S1702).

If a child port including a node for which a node ID is not set yet is detected in step S1702, the node granted the aforementioned setting permission controls to grant a node directly connected to that child port the setting permission (step S1703).

After the process in step S1703, the node granted the setting permission checks if its child ports include nodes for which node IDs are not set yet (step S1704). If a child port including a node for which a node ID is not set yet is detected after the process in step S1704, that node repeats the process in step S1703.

On the other hand, if no child port including a node for which a node ID is not set yet is detected in step S1702 or S1704, the node granted the setting permission sets the self node ID (step S1705).

The node that has set the self node ID broadcasts a self ID packet containing information which pertains to the self node number, the connection states of communication ports, and the like (step S1706). Note that broadcasting is to transfer a communication packet of a given node to unspecified many nodes that form the 1394 network.

Upon receiving the self ID packet, each node can recognize the node numbers assigned to the respective nodes, and can detect a node number assigned to itself. For example, in FIG. 14, node B as the root grants node A connected to a communication port with a smallest port number "#1" a node ID setting permission. Node A assigns the self node number "No. 0", and sets a node ID containing the bus number and node number for itself. Also, node A broadcasts a self ID packet containing that node number.

Figure 18:
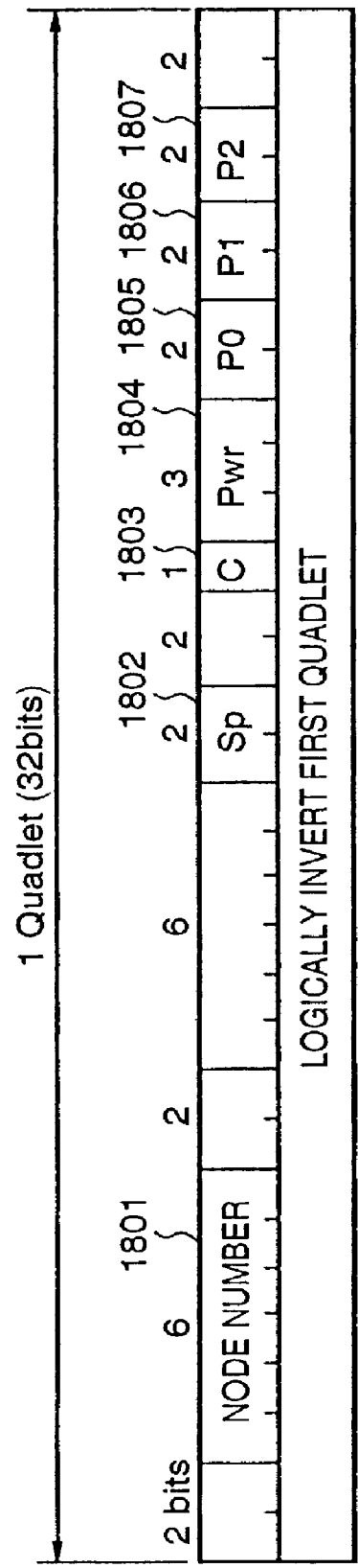
FIG. 18 shows an example of the format of a self ID packet.

FIG. 18 shows an example of the format of the self ID packet. Referring to FIG. 18, reference numeral 1801 denotes a field for storing the node number of a node that output the self ID packet; 1802, a field for storing information which pertains to a compatible transfer rate; 1803, a field indicating the presence/absence of a bus management function (the presence/absence of ability of a bus manager or the like); and 1804, a field for storing information that pertains to characteristics of consumption and supply of electric power.

Also, in FIG. 18, reference numeral 1805 denotes a field for storing information that pertains to the connection state of a communication port with a port number "#0" (connected, non-connected, the parent-child relationship of the communication port, and the like); 1806, a field for storing information that pertains to the connection state of a communication port with a port number "#1" (connected, non-connected, the parent-child relationship of the communication port, and the like); and 1807, a field for storing information that pertains to the connection state of a communication port with a port number "#2" (connected, non-connected, the parent-child relationship of the communication port, and the like).

When a node that outputs the self ID packet has an ability to be a bus manager, a contender bit in the field 1803 is set at "1"; otherwise, the contender bit is set at "0".

Note that the bus manager is a node which has functions of performing power supply management of the bus (that manages information indicating whether or not electric power can be supplied via a communication cable, whether or not power supply is required, and so forth for respective nodes), management of rate information (that manages the maximum transfer rate among nodes on the basis of information which pertains to compatible transfer rates of the respective nodes), management of topology map information (that manages the connection configuration of the network on the basis of the parent-child relationship information of communication ports), optimization of the bus based on the topology map information, and the like, and providing such information to another node. With these functions, the node that serves as a bus manager can perform bus management of the overall 1394 network.

After the process in step S1706, the node that has set the node ID checks if a parent node is present (step S1707). If a parent node is present, that parent node executes the processes in step S1702 and subsequent steps again. Then, that node grants a node for which the node ID is not set yet a permission.

On the other hand, if no parent node is present, that node determines that it is the root itself. The root checks if node IDs have been set for nodes connected to all child ports (step S1708).

If the ID setting process for all the nodes is not complete in step S1708, the root grants one with a smallest number of child ports including that node an ID setting permission (step S1701). After that, the node executes the processes in step S1702 and subsequent steps.

On the other hand, if the ID setting process for all the nodes is complete, the root sets the self node ID (step S1709). After the node ID is set, the root broadcasts a self ID packet (step S1710).

With the aforementioned process, the 1394 network can automatically assign node IDs to the respective nodes.

After the node ID setting process, if a plurality of nodes have an ability of bus manager, a node with the largest node number becomes a bus manager. That is, if the root having the largest node number in the network has a function of a bus manager, the root becomes a bus manager.

However, if the root does not have such function, a node having the next largest node number to the root becomes a bus manager. A node that becomes a bus manager can be detected by checking the contender bit 1803 in a self ID packet broadcasted by each node.

(9) Arbitration Function

Figure 19A:
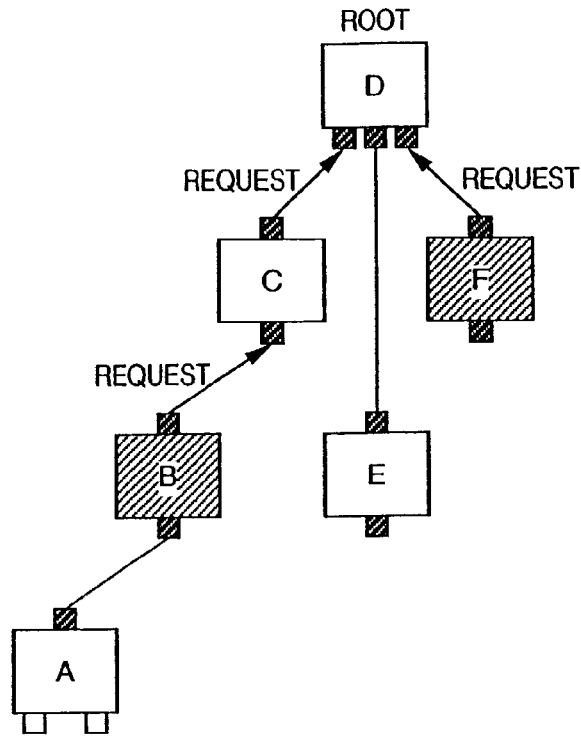
FIGS. 19A and 19B are diagrams for explaining arbitration in the IEEE1394 network in FIG. 1.
Figure 19B:
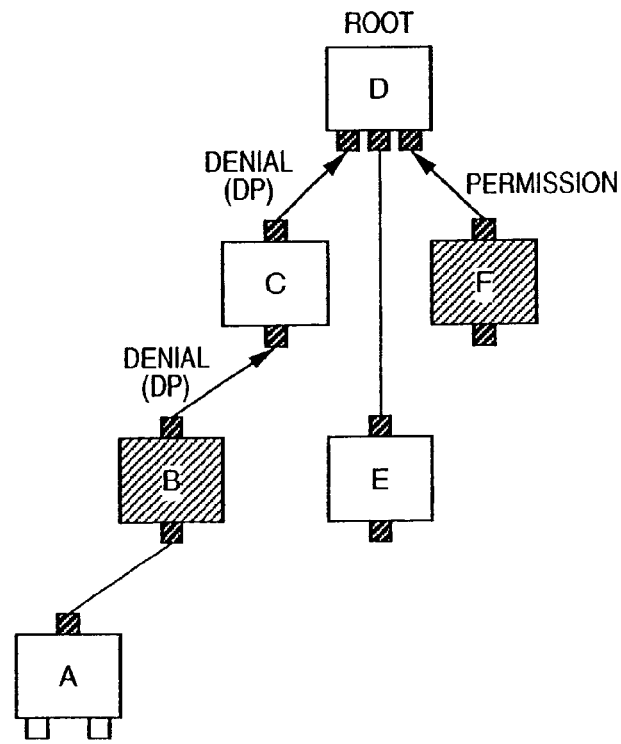

FIGS. 19A and 19B are diagrams for explaining arbitration in the 1394 network in FIG. 1.

In the 1394 network, arbitration of the right to use a bus is made prior to data transfer. The 1394 network is a logical bus network, and an identical packet can be transferred to all the nodes in the network by relaying a communication packet transferred from each node to another node. Hence, arbitration is required to prevent communication packets from colliding. As a result, only one node can transfer at a given timing.

FIG. 19A is a diagram for explaining a case wherein nodes B and F issue requests for the right to use a bus.

After the arbitration begins, nodes B and F issue requests for the right to use a bus to their parent nodes. Upon receiving the request from node B, a parent node (i.e., node C) relays that request for the right to use a bus to its parent node (i.e., node D). This request is finally delivered to the root (node D) that actually arbitrates.

Upon receiving the bus use request, the root determines a node which can use the bus. The arbitration can be done by only the node that serves as a root, and a node that wins arbitration is granted the right to use the bus.

FIG. 19B shows a state wherein the request from node F is granted, and that from node B is denied.

The root sends a DP (Data prefix) packet to the node that loses arbitration, and informs it of denial. The denied node postpones the bus use request until the next arbitration.

By controlling arbitration in this way, the 1394 network can manage the right to use the bus.

(10) Communication Cycle

The isochronous and asynchronous transfer modes can be time-divisionally mixed within each communication cycle period. Note that the communication cycle period is normally 125 μs.

Figure 20:
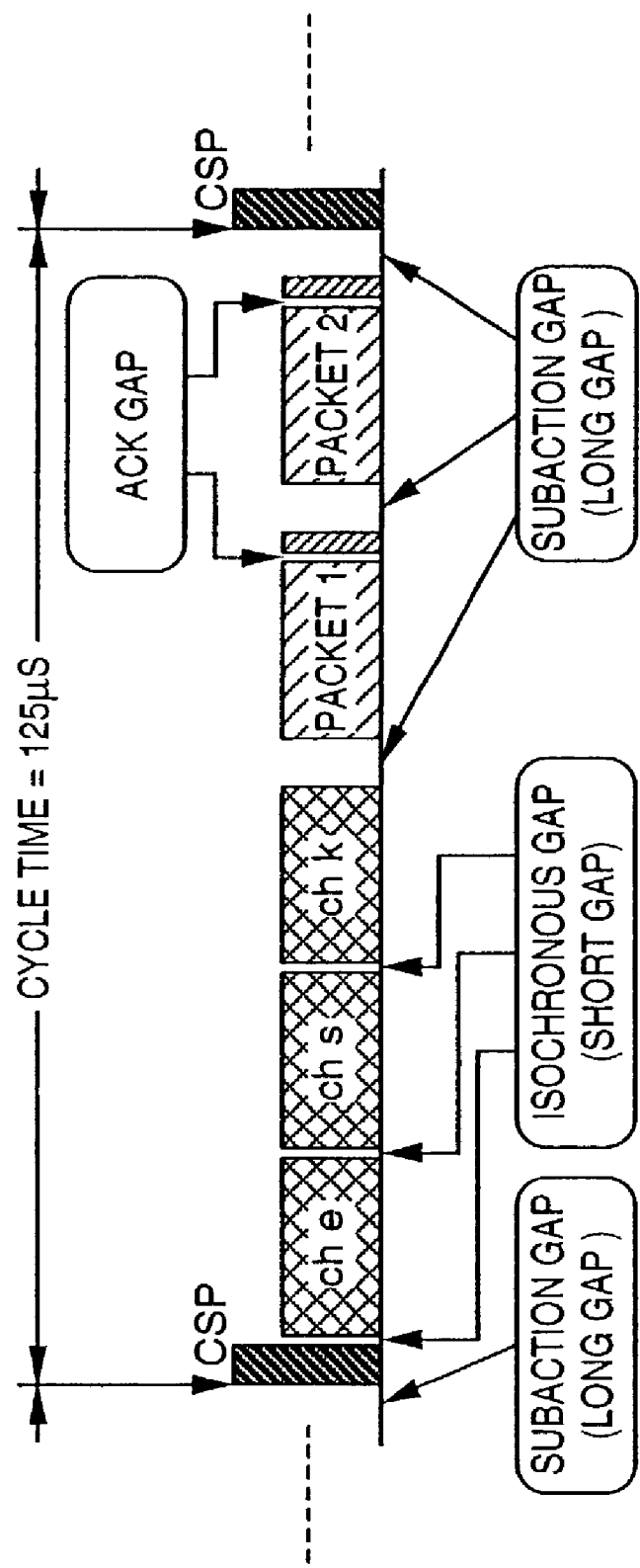
FIG. 20 is a chart for explaining a case in which isochronous and asynchronous transfer modes mix in one communication cycle.

FIG. 20 is a view for explaining a case wherein the isochronous and asynchronous transfer modes are mixed within one communication cycle.

The isochronous transfer mode is executed in preference to the asynchronous transfer mode. This is because an idle period (subaction gap) required to launch asynchronous transfer after a cycle start packet is set to be longer than an idle period (isochronous gap) required to launch isochronous transfer. For this reason, isochronous transfer is executed in preference to asynchronous transfer.

In FIG. 20, upon starting each communication cycle, a cycle start packet (to be abbreviated as CSP hereinafter) is transferred from a predetermined node. Each node adjusts time using this CSP to measure time using the same reference as other nodes.

(11) Isochronous Transfer Mode

The isochronous transfer mode is an isochronous transfer scheme. Isochronous mode transfer can be executed during a predetermined period after the communication cycle starts. Also, the isochronous transfer mode is always executed in each cycle to maintain real-time transfer.

The isochronous transfer mode is suitable for transfer of data such as moving image data, audio data, and the like which require real-time transfer. The isochronous transfer mode is not a one-to-one communication unlike the asynchronous transfer mode, but is a broadcast communication. That is, a packet output from a given node is evenly transferred to all nodes on the network. Note that isochronous transfer does not use any ack (reception confirmation reply code).

In FIG. 20, channel e (ch e), channel s (ch s), and channel k (ch k) indicate periods in which respective nodes make isochronous transfer. In the 1394 interface, different channel numbers are given to identify a plurality of different isochronous transfers. In this way, isochronous transfer can be done among a plurality of nodes. Note that the channel number does not specify a destination but merely assigns a logical number to data.

The isochronous gap shown in FIG. 20 indicates an idle state of the bus. After an elapse of a predetermined period of time in this idle state, a node that requires isochronous transfer determines that the bus can be used, and executes arbitration.

Figure 21:
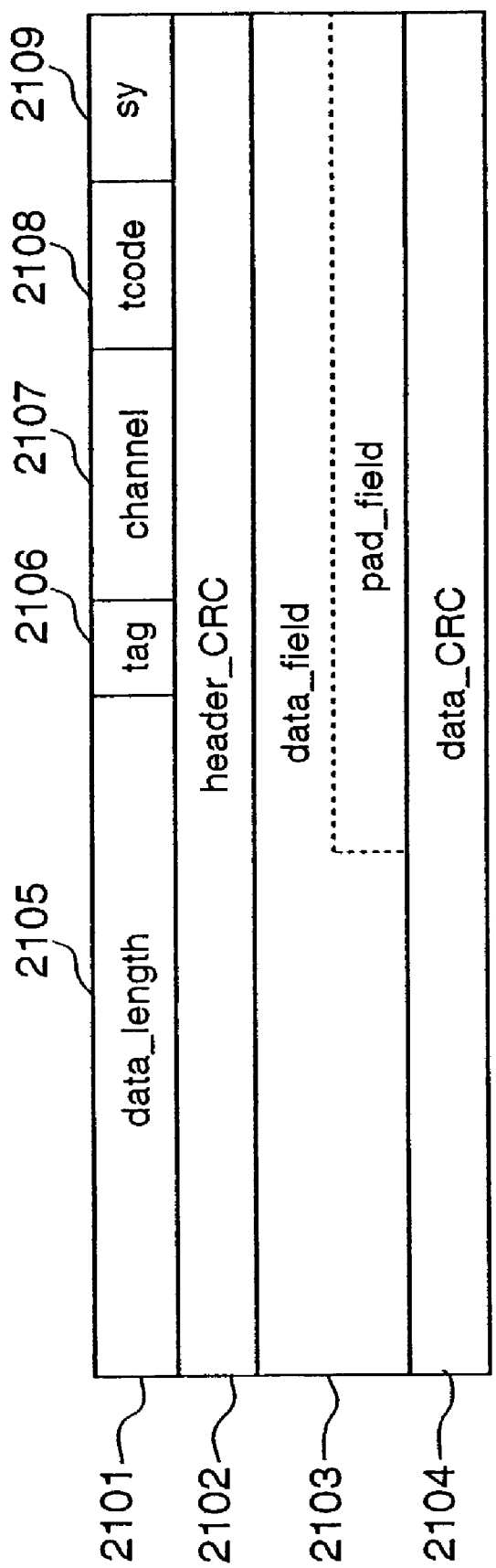
FIG. 21 shows the format of a communication packet transferred based on the isochronous transfer mode.

FIG. 21 shows the format of a communication packet transferred based on the isochronous transfer mode. A communication packet transferred based on the isochronous transfer mode will be referred to as an isochronous packet hereinafter.

In FIG. 21, an isochronous packet is made up of a header area 2101, header CRC 2102, data area 2103, and data CRC 2104.

The header area 2101 includes a field 2105 for storing the data length of the data area 2103, a field 2106 for storing format information of the isochronous packet, a field 2107 for storing the channel number of the isochronous packet, a field 2108 for storing a transaction code (tcode) that identifies the format of the packet and a process to be executed, and a field 2109 for storing a synchronization code.

(12) Asynchronous Transfer Mode

The asynchronous transfer mode is an asynchronous transfer scheme. Asynchronous transfer can be executed during a period after the completion of the isochronous transfer period until the next communication cycle starts (i.e., a period until the CSP of the next communication cycle is transferred).

In FIG. 20, the first subaction gap indicates an idle state of the bus. After this idle time has reached a given value, a node that requires asynchronous transfer determines that the bus can be used, and executes arbitration.

Figure 22:
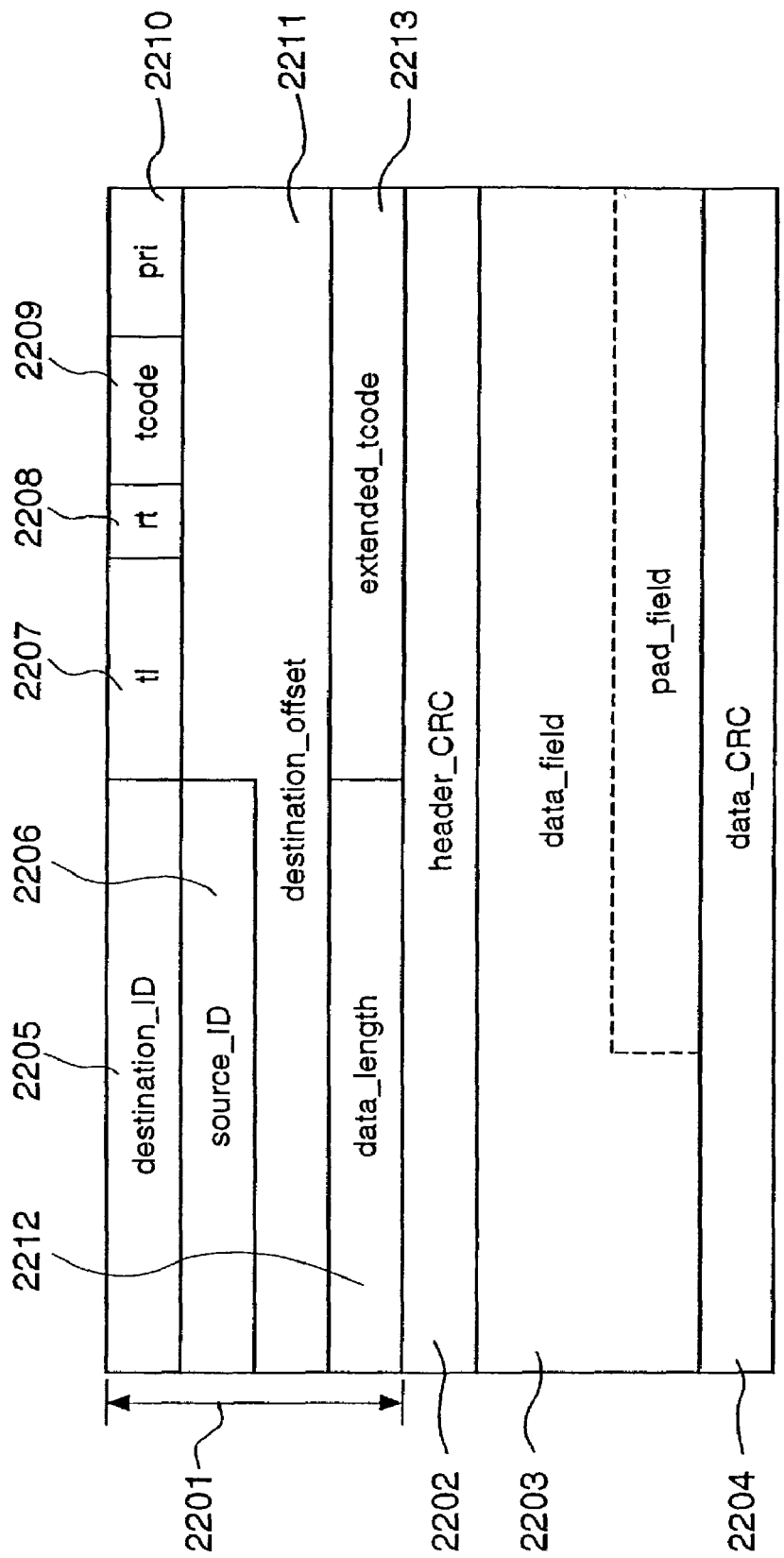
FIG. 22 shows the format of a communication packet based on the asynchronous transfer mode.

A node that acquires the right to use the bus by arbitration transfers a packet shown in FIG. 22 to a predetermined node. Upon receiving this packet, the node sends back ack (reception confirmation reply code) or a response packet after an ack gap.

FIG. 22 shows the format of a communication packet based on the asynchronous transfer mode. A communication packet transferred based on the asynchronous transfer mode will be referred to as an asynchronous packet hereinafter.

Referring to FIG. 22, an asynchronous packet is made up of a header area 2201, header CRC 2202, data area 2203, and data CRC 2204.

In the header area 2201, a field 2205 stores the node ID of a destination node, a field 2206 stores the node ID of the source node, a field 2207 stores a label indicating a series of transactions, a field 2208 stores a code indicating resend status, a field 2209 stores a transaction code (tcode) that identifies the format of the packet and a process to be executed, a field 2210 stores the priority order, a field 2211 stores the memory address of the destination, a field 2212 stores the data length of the data area, and a field 2213 stores an extended transaction code.

Asynchronous transfer is a one-to-one communication from the self node to the partner node. A packet transferred from a source node in the asynchronous transfer mode is transferred to all nodes in the network, but is ignored if it is not addressed to the self node. Hence, only the node as the destination can read that packet.

When the transfer timing of the next CSP is reached during asynchronous transfer, the transfer is not forcibly interrupted, and the next CSP is sent after the completion of that transfer. When one communication cycle exceeds 125 μs, the next communication cycle is shortened accordingly. In this manner, the 1394 network can maintain nearly constant communication cycles.

<Conventional Circuit Arrangement>

Figure 23:
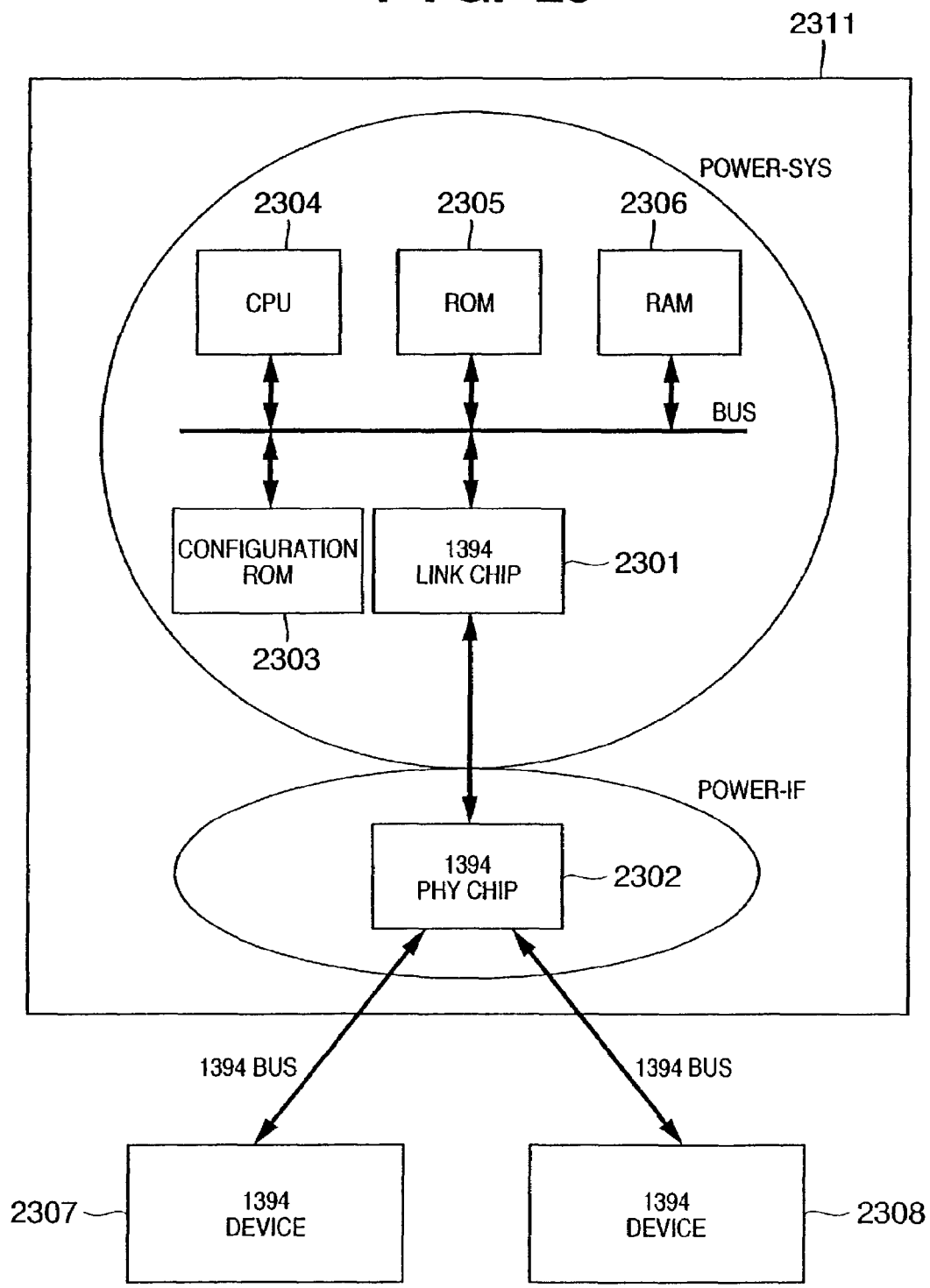
FIG. 23 is a diagram showing the arrangement of an interface peripheral block in a conventional device having an IEEE1394 serial bus.

FIG. 23 shows the arrangement of an interface peripheral block in a conventional device having an IEEE1394 serial bus. An IC 2301 is an IC (LINK chip) that implements the functions of the link layer described previously in "Technical Outline of IEEE1394", and has, as principal functions, functions of a transmission/reception FIFO for temporarily storing transmission/reception data via a PHY chip (to be described later), packetization of transmission data, error check of data, mediation of an interface with a device main body, and the like. An IC 2302 is an IC (PHY chip) that implements the function of the physical layer which directly drives the 1394 serial bus in "Technical Outline of IEEE1394" above, and has, as principal functions, initialization and arbitration of the 1394 bus, encoding/decoding of transmission data, monitor of the cable energization state, supply of a load terminating power supply, interface with the LINK chip, and the like.

A configuration ROM 2303 stores identification and communication conditions unique to respective devices, and the like. The data format of the configuration ROM 2303 complies with the format specified by the IEEE1212 and IEEE1394 standard, as has been explained in "Technical Outline of IEEE1394". A CPU 2304 controls 1394 interface control ICs such as the LINK chip 2301 and PHY chip 2302. A ROM 2305 stores a control program required for the CPU 2304 to execute the interface control. A RAM 2306 is used by the CPU 2304 as a control work area and to temporarily hold transmission/reception data. The RAM 2306 is also used as data areas of various registers mapped in the address space in the 1394 interface, and the like. Devices A 2307 and B 2308 are other devices having 1394 interfaces, and are connected to a device 2311 via 1394 serial buses. Note that a function that the device 2311 relays data exchange between devices A and B is called a repeater function. That is, when the device 2311 repeats data as one reply point, data can be exchanged between the devices A 2307 and B 2308.

Figure 25:
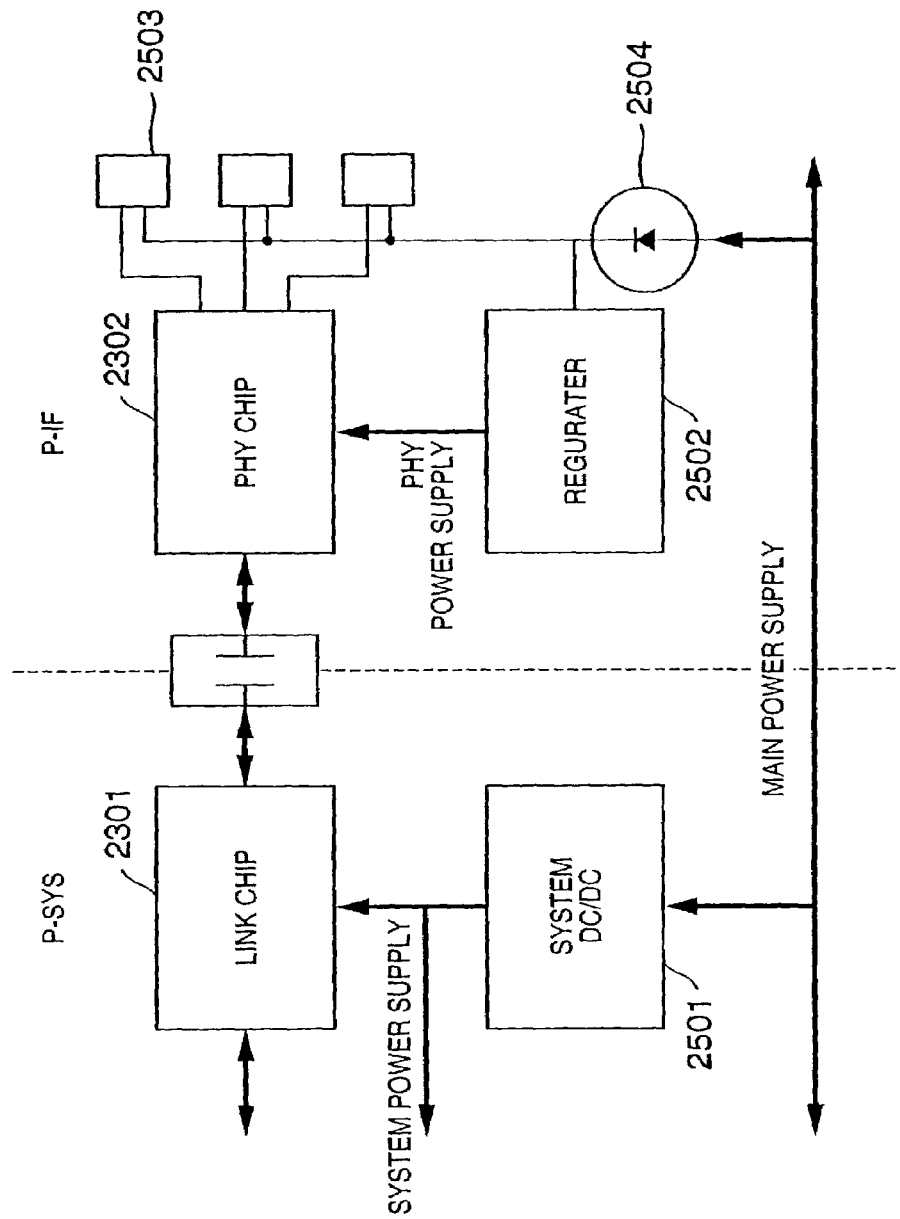
FIG. 25 is a diagram for explaining the arrangement of a power supply circuit in a conventional device.

FIG. 25 is a diagram for explaining the arrangement of a power supply circuit in the conventional device. P-IF indicates a block which operates by a regulator circuit 2502 which supplies electric power to the PHY chip 2302. Since a line that OR-connects a cable power supply from each 1394 connector 2503 and a main power supply of the main body system via a diode 2504 is connected to the input of the regulator circuit 2502, even when the main power supply is OFF, a PHY power supply is output as long as the cable power supply is connected. For this reason, this node can be used as a repeater. When the main power supply is ON, if a node that operates by receiving an external power supply is connected to the 1394 connector 2503, electric power can be supplied to that node.

P-SYS indicates a block which operates by a system DC/DC 2501 which supplies electric power to circuits connected after the LINK chip 2301. The system DC/DC circuit 2501 that receives the main power supply outputs a system power supply, which is converted into an internal operation voltage, thus supplying electric power to the entire system. As for connection between the PHY chip 2302 and LINK chip 2301, when the repeater function on the 1394 bus is used, since the power supply circuit of the PHY block must be separated, a method of insulating using a DC insulation barrier circuit that uses a transformer, capacitor, and the like is used. An example of such method is described in items of appendix J of "IEEE1394 specification".

The system arrangement of this embodiment will be described below.

Figure 24:
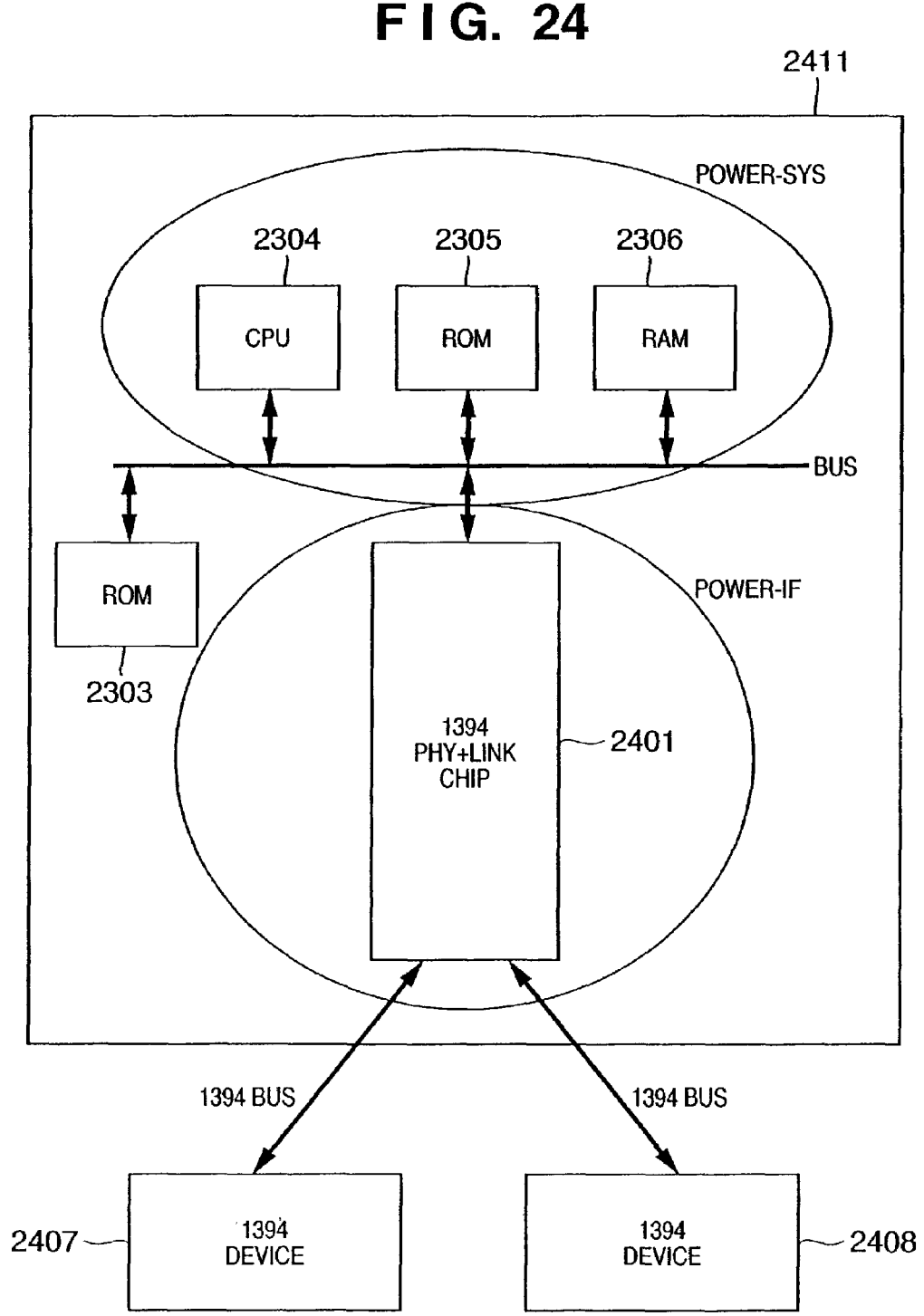
FIG. 24 is a diagram showing the arrangement of an interface peripheral block in a device of this embodiment having an IEEE1394 serial bus.

FIG. 24 shows the arrangement of an interface peripheral block in a device of this embodiment which has an IEEE1394 serial bus. An IC 2401 is an IC (PHY+LINK chip) having the functions of the link layer and physical layer, a ROM 2303 is a configuration ROM, a CPU 2304 controls 1394 interface control ICs such as the PHY+LINK chip 2401, a ROM 2305 stores a program, and a RAM 2306 is used by the CPU 2304 as a control work area and to temporarily hold transmission/reception data. Devices A 2407 and B 2408 are other devices having 1394 interfaces, and are connected to a device 2411 via 1394 serial buses. Note that the device 2411 has a repeater function of relaying data exchanged between devices A and B. That is, when the device 2411 repeats data as one relay point, data can be exchanged between the devices A 2407 and B 2408.

Figure 26:
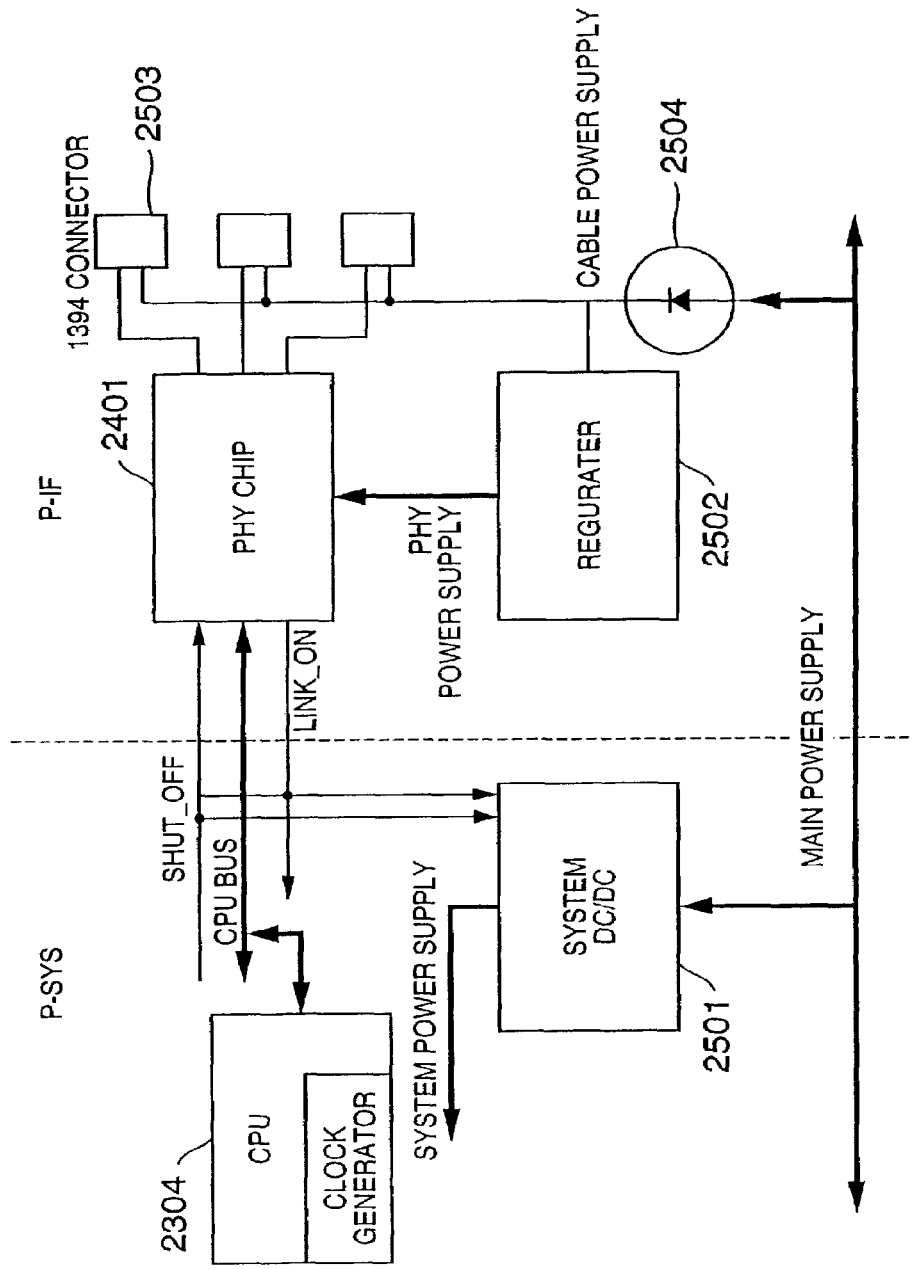
FIG. 26 is a diagram for explaining the arrangement of a power supply circuit in a device of this embodiment.

FIG. 26 is a diagram for explaining the arrangement of a power supply circuit in the device of this embodiment. P-IF indicates a block which operates by a regulator circuit 2502 which supplies electric power to the PHY+LINK chip 2401. A line that OR-connects a cable power supply from each 1394 connector 2503 and a main power supply of the main body system via a diode 2504 is connected to the input of the regulator circuit 2502. Hence, even when the main power supply is OFF, a PHY power supply of the regulator 2502 is output as long as the cable power supply is supplied. For this reason, the PHY+LINK chip 2401 can operate and can execute the repeater function on the 1394 bus. When the main power supply is ON, if a node that operates by receiving an external power supply is connected to the 1394 connector 2503, electric power can be supplied to that node.

P-SYS indicates an area which operates by a system DC/DC 2501 which supplies electric power to circuits of the main body system connected to a CPU bus. The system DC/DC circuit 2501 that receives the main power supply outputs a system power supply, which is converted into an internal operation voltage, thus supplying electric power to the entire system. A SHUT_OFF signal is used to turn off the power supply circuit 2501 from the system side. A LINK_ON signal is used to turn on the power supply circuit 2501 from the PHY+LINK chip 2401 side. Since the LINK_ON signal is also used as a trigger upon resuming the system from a sleep mode or suspend mode as a power saving mode that changes the clock rate, it is also supplied to a circuit for controlling the clock rate, e.g., the CPU 2304. The LINK_ON signal is generated in response to reception of a packet, which is sent from another connected device to that device.

The conventional device adopts the method of insulating the connection between the PHY and LINK chips using the DC insulation barrier circuit that uses a transformer, capacitor, and the like. However, in this embodiment, since the PHY and LINK chips in the conventional device are formed by a single PHY+LINK chip, power supply separation cannot be made. Hence, power supply separation must be done between the PHY+LINK chip 2401 and another IC (device) connected to that chip via a bus. When power supply separation is made to have the CPU bus as a boundary, all ICs connected to the CPU bus must have DC insulation barrier circuits, resulting in increases in the number of parts and cost.

Therefore, when the PHY+LINK chip 2401 is used, power supply separation is normally given up, and a method of using the sleep mode in which electric power is supplied to ICs connected to the CPU bus even when the device serves only as a repeater, and power consumption is suppressed by setting a low operation clock rate is used. However, since the sleep mode consumes currents to some extent, standby consumption currents increase, and a problem is posed upon reducing consumption power.

Figure 27:
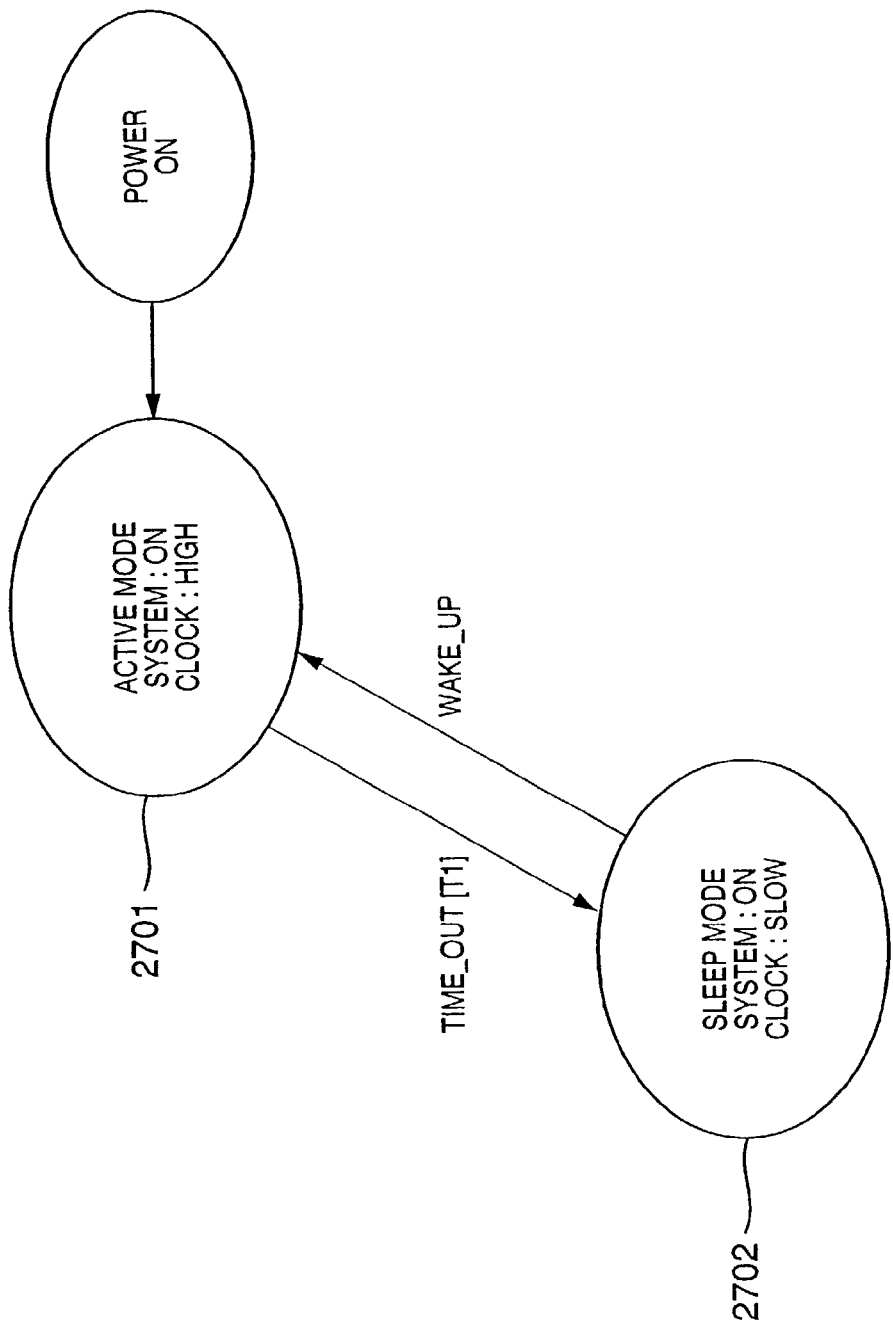
FIG. 27 is a status transition chart showing status changes of a device with the arrangement shown in FIG. 26.

FIG. 27 is a status transition chart showing a change in status of the device with the arrangement shown in FIG. 26. This status transition corresponds to a power saving state of a system block controlled by the CPU. Status transition occurs in response to a TIME_OUT signal which is output from a timer and indicates an elapse of a predetermined period, or a WAKE_UP or LINK_UP signal which serves as a trigger for restoration. The same applies to the status transition charts in FIG. 28 and subsequent drawings. The device in FIG. 27 has two operation modes. That is, an active mode as the first mode corresponds to a state when the power supply is turned on in response to a POWER_ON signal generated by a power supply restoration sequence by user's operation, i.e., a normal operation state in which the device is started up from the power-ON reset sequence and a data process can be executed at any time. A sleep mode as the second mode corresponds to a state when a TIME_OUT signal is generated since a standby state duration without any data process has reached T1, i.e., a state in which a low clock rate that can maintain information in an internal memory and register is set to reduce consumption power by the device itself. In general, when a peripheral device connected to a PC is not used by the PC for a predetermined period of time, the device itself executes a power management process, and stands by in a sleep state until a data process request is received from the PC. In this sleep state, since a D-RAM refresh operation, a CPU clock-down operation, and the like are always done, minute currents flow, but the device can promptly respond to a data access request generated by another node connected to the serial bus.

Circuit Arrangement in This Embodiment (Power Supply Separation Circuit)

Figure 29:
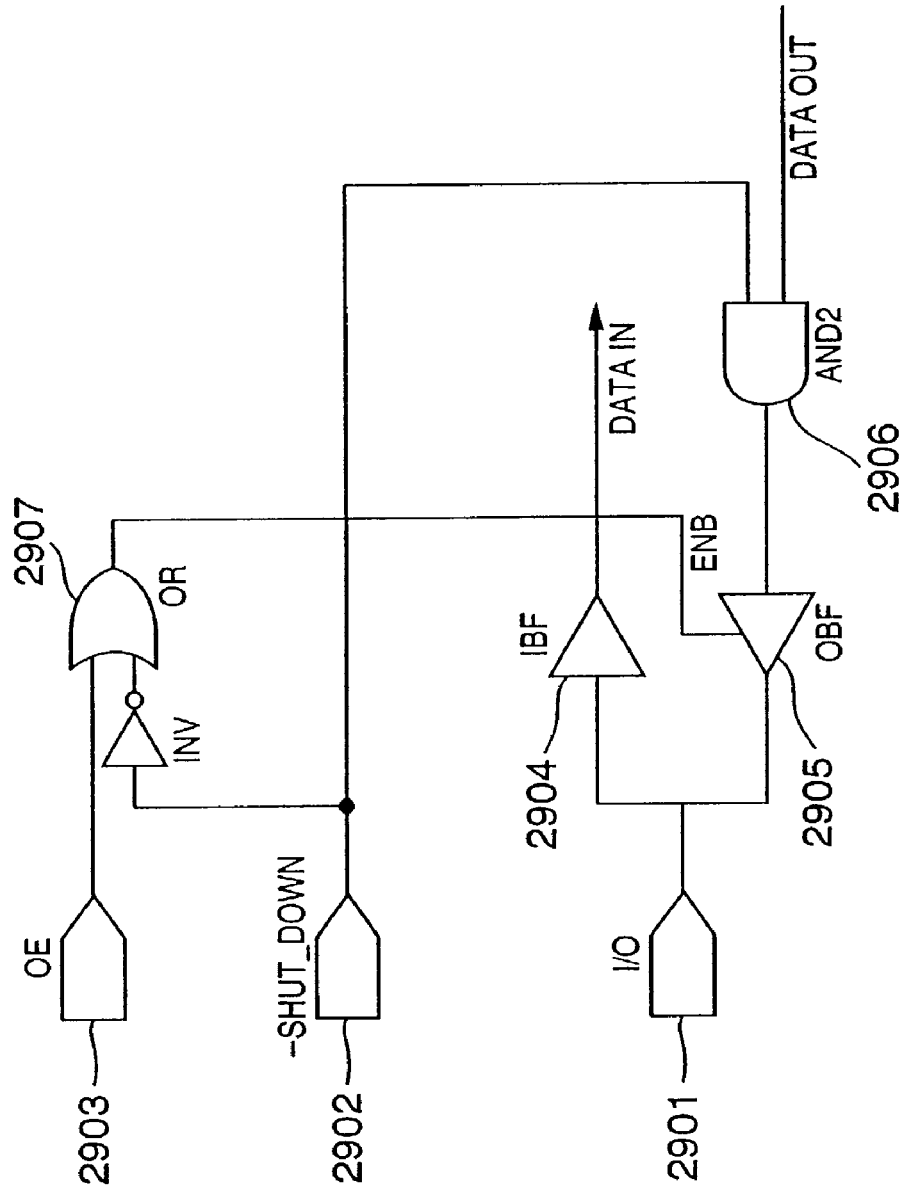
FIG. 29 is a diagram showing the structure around an I/O port in a PHY+LINK chip upon power supply separation to have a CPU bus as a boundary.

FIG. 29 shows the structure around an I/O port in the PHY+LINK chip 2401 when power supply separation is done to have the CPU bus as a boundary. An I/O port 2901 is one of data/address buses connected to the CPU bus, and a SHUT_DOWN signal 2902 indicates power OFF when it is at LOW level. An OE signal 2903 is activated when data is output onto the CPU bus, and a READ signal from the CPU is normally connected. IBF 2904 indicates an input buffer, and OBF 2905 indicates an output buffer. A DATAIN signal input via the IBF 2904 and a DATAOUT signal output via the OBF 2905 are bus signals in the PHY+LINK chip 2401. In general, circuits in the chip are designed while being divided into those for the DATAIN signal and those for DATAOUT signals in place of use of a two-way bus so as to avoid data conflicts.

In a power OFF sequence of the I/O port 2901 in FIG. 29, when the SHUT_DOWN signal 2902 goes LOW, the output level of an AND gate 2906 is fixed at LOW level. The output from an OR gate 2907 goes HIGH irrespective of the OE signal 2903 to activate the OBF 2905, and the direction of the I/O port 2901 is switched to an output direction. For this reason, the I/O port 2901 of the PHY+LINK chip 2401 outputs a LOW-level signal. In this way, the terminal state is fixed at LOW level in place of high impedance. Even when the power supply of a device connected to the I/O port 2901 is shut down in this state, the signal level of the I/O port in a power OFF state can be settled as long as the PHY+LINK chip 2401 operates.

The CPU bus connected to the I/O port 2901 is normally implemented by a CMOS circuit. It is difficult for the insulation circuit in the prior art to insulate the CMOS circuit due to generation of leak currents. By contrast, since this embodiment outputs a LOW-level signal to the bus as the CMOS circuit, the PHY+LINK chip 2401 and the CPU bus can be separated.

(Status Transition)

Figure 28:
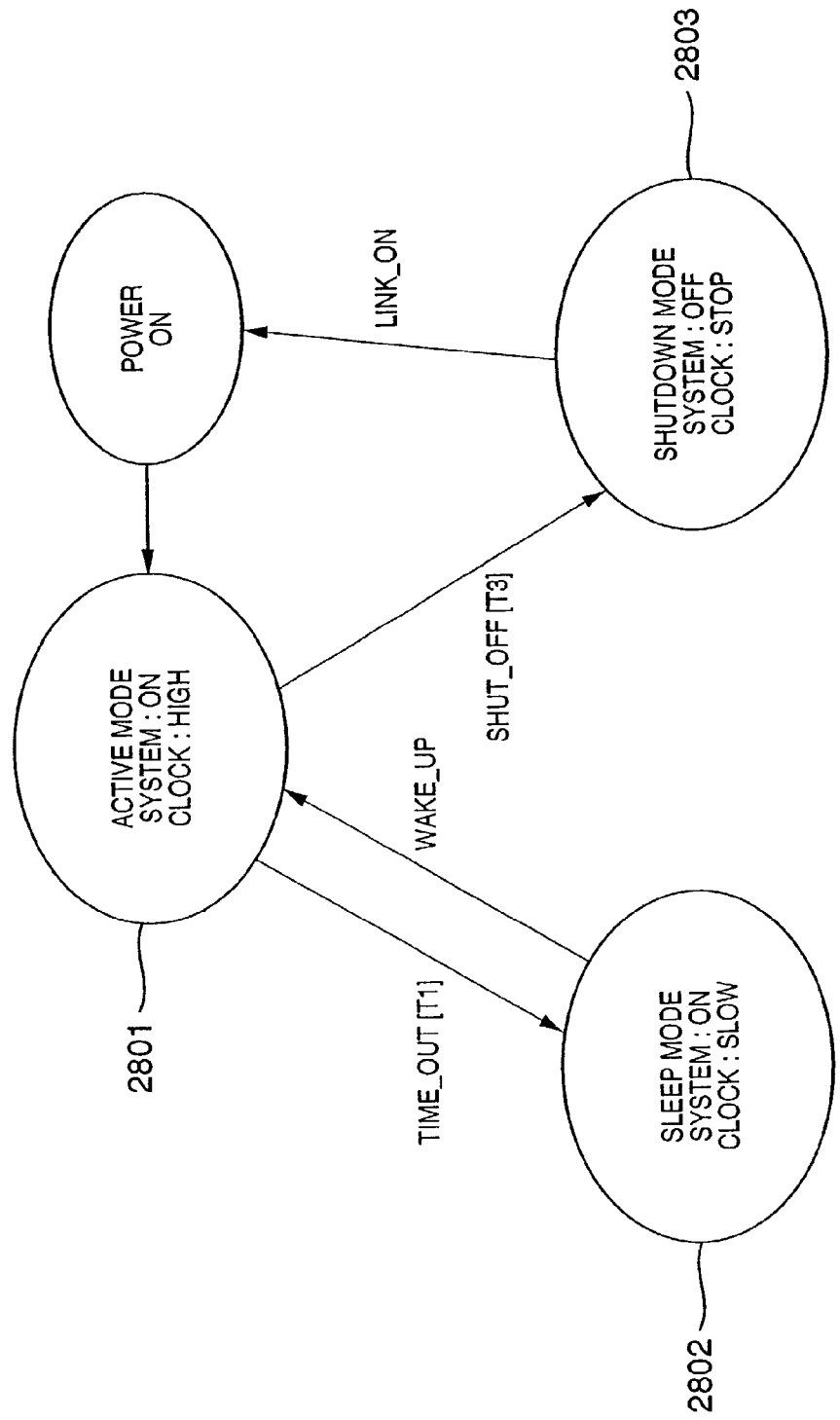
FIG. 28 is a status transition chart showing status changes of a device in the first embodiment.

FIG. 28 is a status transition chart showing status changes of the device in the first embodiment to which the present invention is applied. This status transition chart has three operation modes. An active mode 2801 as the first mode indicates a normal state after a power ON operation is made in response to a POWER_ON signal generated by user's operation, or in which the device 2411 is started up from a power-ON reset operation in response to a LINK_ON signal and a data process can be executed at any time. Note that the LINK_ON signal is generated by the PHY+LINK chip 2401 upon receiving a LINK_ON packet via a communication line (see FIG. 26).

A sleep mode 2802 as the second mode indicates a low consumption power state in which a low clock rate that can maintain information in an internal memory and register is set by a TIME_OUT signal to reduce consumption power by the device itself when a standby state continues for a predetermined time T1 without any data process. When the device is in the sleep mode 2802, an interrupt signal WAKE_UP is generated in response to a data process request, and the device can promptly transit to an active mode. The WAKE_UP signal is activated when the user makes predetermined operation or when the PHY+LINK chip 2401 informs the CPU 2304 of reception of a LINK_ON packet.

A shutdown mode 2803 as the third mode indicates a state wherein the power supply of the device is completely OFF. After an elapse of a wait time T2 in the sleep mode, the WAKE_UP signal is generated to temporarily set the active mode, and the required contents of a memory and register are backed up on a nonvolatile memory or the like. After that, a SHUT_OFF signal is generated to set the shutdown mode, thus completely turning off the power supply. At this time, since all information contents on the memory and register are cleared, restoration from the shutdown mode requires the same process as the device startup process by a power-ON reset operation. Control of these operations is implemented when the CPU 2304 executes a predetermined program. The SHUT_DOWN signal goes LOW when the power supply of the device is turned off in response to the SHUT_OFF signal. As a result, the signal level of the port of the PHY+LINK chip 2401 on the CPU bus side is set at LOW level by the operation of the power supply separation circuit in FIG. 29.

The difference from the example in FIG. 27 is the presence/absence of the shutdown mode. Since the power supply separation circuit in FIG. 29 can turn off the system power supply 2501, the system according to the present invention can select the shutdown mode as a power control method. Although a system block P-SYS is completely OFF in the shutdown mode, only the PHY+LINK chip alone is active to allow a repeater operation when electric power is supplied from another device via a cable connected to a 1394 terminal. For this reason, when LINK_ON packet data is sent from another peripheral device to this device even during the repeater operation, a LINK_ON signal is activated to start up the DC/DC power supply circuit 2501 so as to launch the system block P-SYS, and the device transits to the active mode, thus immediately starting a data process.

The device must receive a packet such as a LINK_ON packet or the like from another device to generate the LINK_ON signal. Since reception of a packet is the function of the link layer, the device in which the link layer does not function cannot receive the LINK_ON packet. Therefore, since a device which makes a repeater operation using only the PHY chip cannot receive the LINK_ON packet, it is impossible to implement power supply by the system DC/DC power supply 2501.

By contrast, in this embodiment, since the function of the link layer can be executed by electric power supplied from the cable even when the system power supply is OFF, the LINK_ON signal can be generated by receiving a packet. As a result, a power ON operation can be made by a remote device.

Second Embodiment

In the first embodiment, consumption power can be perfectly cut by turning off the power supply circuit of the device by the power saving control. However, in order to resume the device, a power supply startup sequence starting from a power ON operation must be executed, resulting in a long startup time. That is, no problem is posed if a response to the LINK_ON packet sent on the serial bus can be sent back within an allowable time of a partner device. However, some device may start an error process when it cannot wait that response. If the response time is preferentially shortened, since a measure is taken using the sleep mode as the power saving control, consumption power increases in such case even in a standby state as long as ICs that make clock operations are present.

Figure 30:
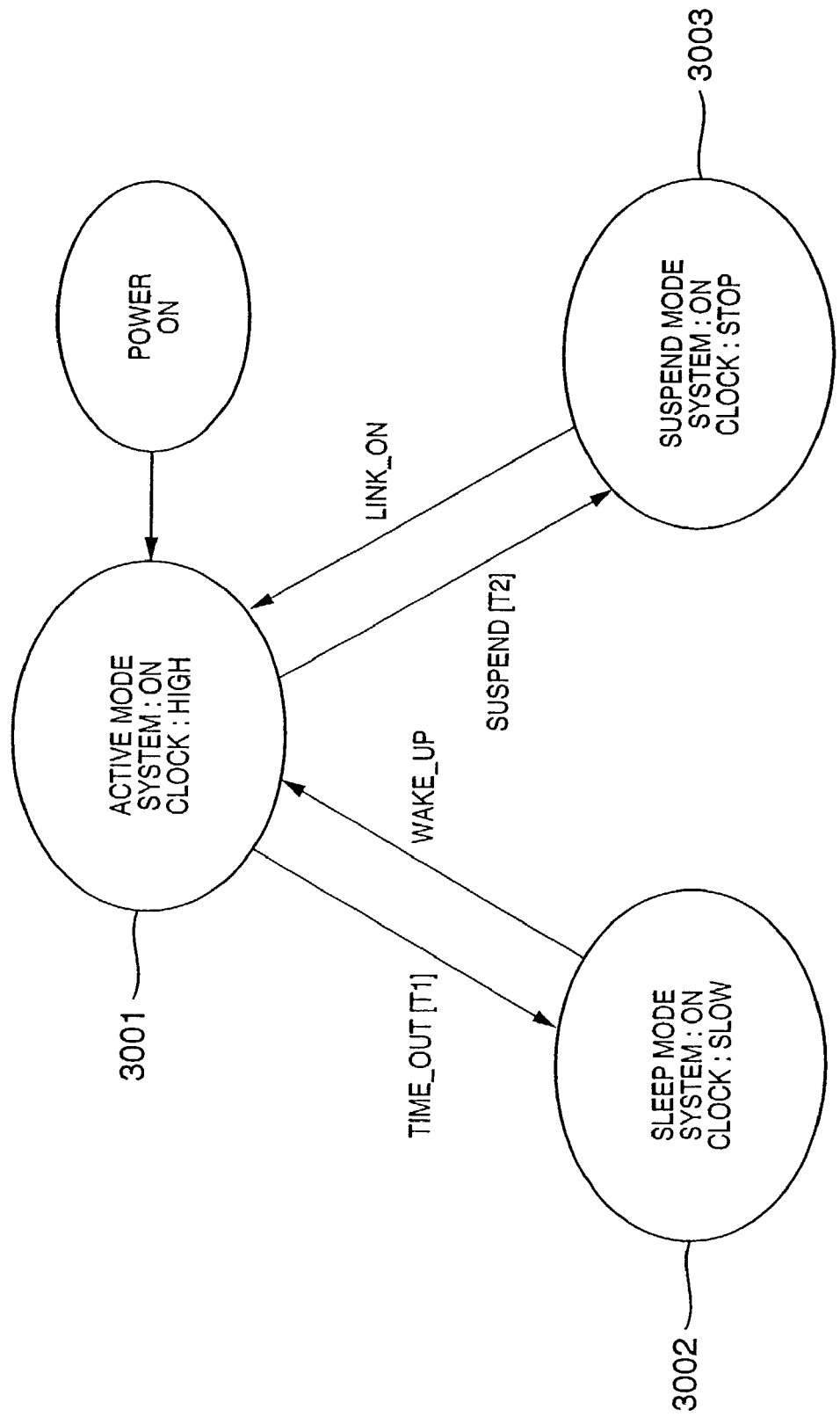
FIG. 30 is a status transition chart showing status changes of a device in the second embodiment.

In the second embodiment, a suspend state (suspend mode) 3003 is added as power saving control, as shown in the status transition chart of FIG. 30. In the suspend mode 3003, all clocks to be supplied to ICs in the device as well as a CPU are halted while the power supply is ON to set a HALT state in which the clocks to the CPU are halted, thereby greatly reducing consumption power. That is, a clock oscillation circuit and data holding circuits using clocks consume most of electric power in the standby state. The suspend mode is a state that aims at reducing such consumption power. If the clock operation is halted, a static memory (e.g., an S-RAM, registers of respective ICs, and the like) can hold data, but a dynamic memory (D-RAM or the like) can no longer hold data. That is, since the contents of the registers of respective ICs as static memories can be held, the time required for the initial process of the ICs can be shortened upon restarting the device. Since the device enters the suspend mode 3003 after the sleep state continues for a long period of time, i.e., under the condition that a data process of the device is complete during that interval, no intermediate data of the process remains on the D-RAM. Hence, upon resuming the device, no problem is posed even if the contents of the D-RAM have been cleared. Also, if the register values of other ICs remain held, the time required for the initial process can be cut.

Upon examining the I/O ports of the ICs, which are connected to the CPU bus, of those used in the device, all chip select terminals are disabled since no access to the ICs occurs in the suspend state. Hence, by similarly using the circuit shown in FIG. 29, the level of the I/O port of the PHY+LINK chip can be settled to be LOW even in the suspend mode, and the influences of, e.g., an increase in consumption power due to leak currents or the like can be removed.

The suspend mode is implemented by stopping clock generation by a clock generator incorporated in the CPU 2304. The clock generator need not be incorporated in the CPU.

Third Embodiment

As described above, the three states, i.e., the sleep, suspend, and shutdown modes as power saving modes have been individually explained. One device can selectively use these three power saving modes.

Figure 31:
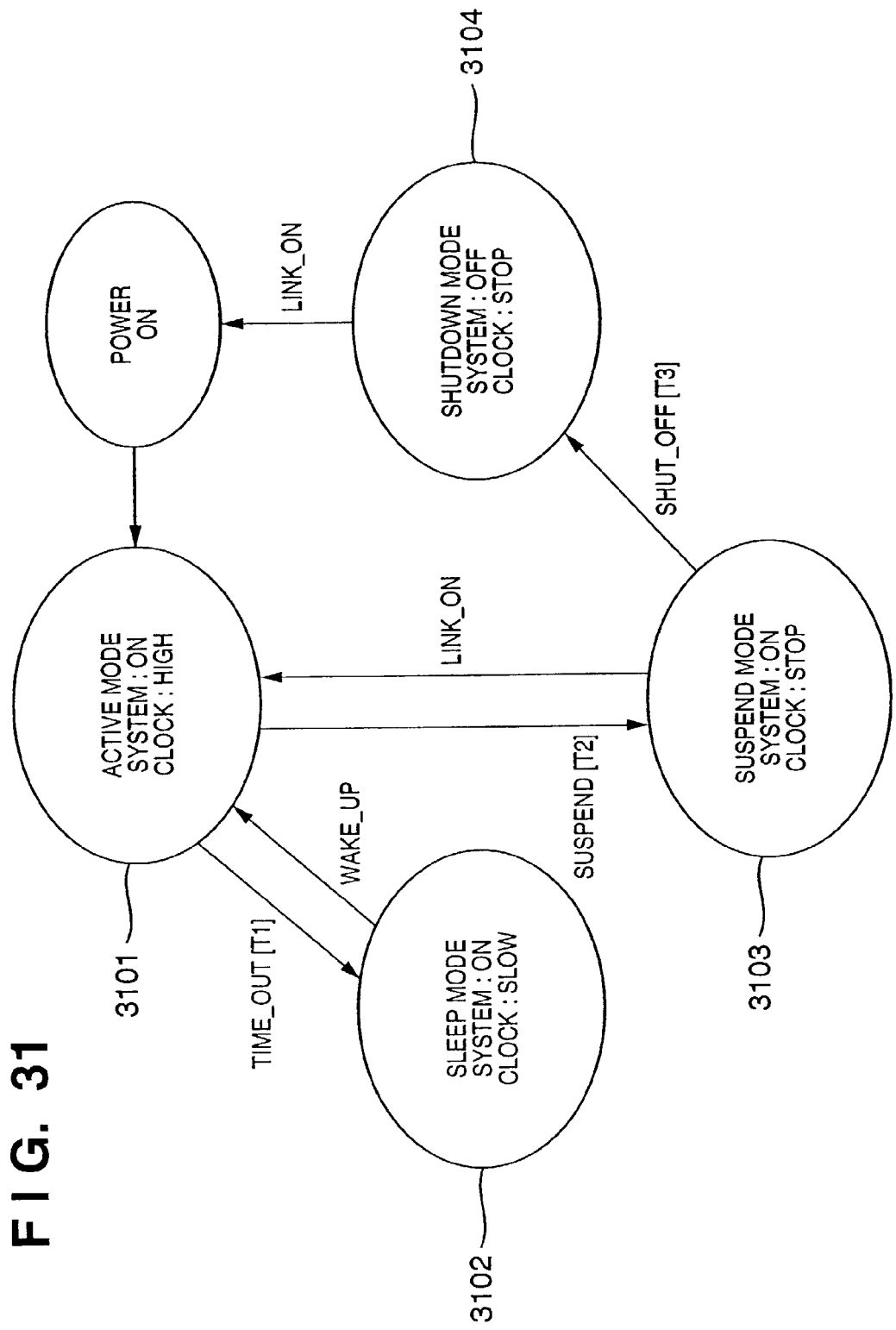
FIG. 31 is a status transition chart showing status changes of a device in the third embodiment.
Figure 32:
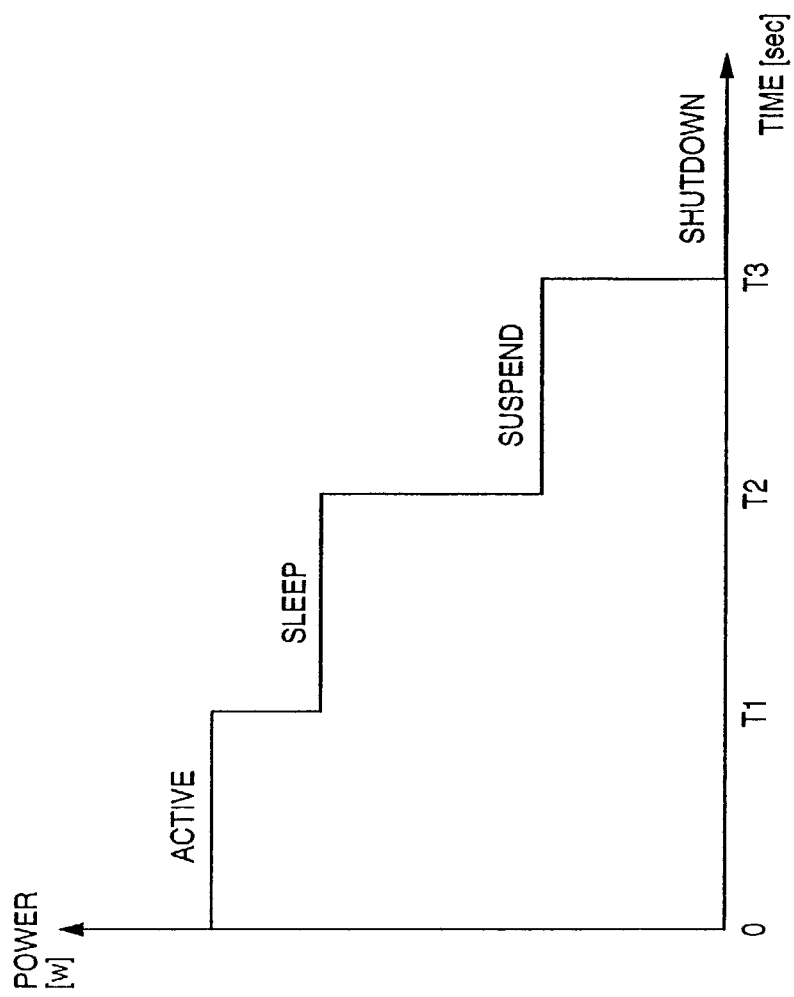
FIG. 32 is a graph for explaining electric powers required for respective modes.

FIGS. 31 and 32 show a state wherein one device makes the transition to a power saving mode.

A TIME_OUT signal is generated after an elapse of a predetermined wait time from an active mode 3101 in which a normal operation is made, thus setting a sleep mode 3102. In this state, since a CPU operates slowly, it consumes electric power to some extent. After an elapse of a wait time T2, the device temporarily transits to the active mode 3101 to prepare for transition to a suspend mode 3103. The device then transits to the suspend mode 3103, in which clocks are halted, in response to a SUSPEND signal. Furthermore, after an elapse of a wait time T3, a power supply circuit is turned off in response to a SHUT_OFF signal, thus setting a shutdown mode 3104. The contents of the transition process to the power saving modes have been explained, and transitions to respective modes are made in only a predetermined order.

As shown in FIG. 32, the consumption power lowers as the power saving mode changes.

As for the restoration process from the power saving mode, in the sleep mode, the operation clock speed is set to be lower than that in the active mode, but the basic operation of the device remains the same. Hence, the device can be restored from the sleep mode by returning the operation clock speed to a normal speed in response to a WAKE_UP signal, which is immediately output upon generation of an access request from another device.

In the suspend mode, since clock supply to the CPU is stopped, the device cannot continue a normal operation as one node. Instead, the node can be activated by a LINK_ON packet sent from another device as needed. At this time, the CPU executes an interrupt process in response to the LINK_ON signal, thus restoring the device.

Finally, in the shutdown mode, since the power supply circuit is completely OFF, the device is present on the network as a node but cannot respond to any access. However, a power supply startup process (power ON sequence) is executed in response to a LINK_ON packet, thus executing a startup process of the device.

As described above, the device of this embodiment has a repeater function on the IEEE1394 serial interface, transits to one of the power saving modes after an elapse of a predetermined wait time or more of data transfer, immediately executes a restoration process from the state of each power saving mode upon receiving a LINK_ON packet, and can transit to a state in which a data process can be executed.

Note that the IC 2401 is designed to be able to update the network configuration while receiving electric power from another device and maintaining the sleep or suspend state, even when a bus reset is launched in the sleep or suspend mode.

In this manner, the device can wake up upon receiving a LINK_ON packet, but can be prevented from unwantedly waking up in response to each bus reset.

More preferably, when the internal memory of the IC 2401 stores information to be exchanged upon bus reset before the device goes to the suspend or reset mode, even information that cannot be obtained before the device wakes up in a conventional system can be exchanged upon bus reset without waking up the device.

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

As described above, since the device of this embodiment uses an IC that integrates the functions of the link and physical layers, the functions of the link and physical layers can be driven by electric power supplied from another device via a cable. Furthermore, the IC has an arrangement for outputting a predetermined signal level from a port connected to a CPU bus which comprises a CMOS, when the system power supply of the device is turned off. In this manner, even when the power supply of a circuit connected to the CPU bus is turned off, the physical and link layers of the serial interface can function by electric power supplied via an interface cable. Hence, a packet can be received even when the power supply is OFF, and the packet type can be discriminated. If the received packet is a LINK_ON packet, the system power supply can be turned on.

A device such as a digital camera, printer, or the like, which is connected using a communication line such as an IEEE1394 serial interface that can supply electric power, uses an IC prepared by forming both the physical and link layer circuits on a single chip, has three states, i.e., sleep, suspend, and shutdown modes as power saving control in a device standby state, and can execute a restoration process from any state upon receiving an activation request using a LINK_ON packet from another device.

Even when power control is made to set a shutdown state, the device can be restored from that state in response to a signal received via a communication line.

As many apparently widely different embodiments of the present invention can be made without departing from the spirit and scope thereof, it is to be understood that the invention is not limited to the specific embodiments thereof except as defined in the appended claims.

What is claimed is:

1. A data processing apparatus which is connected to another device via a communication line, comprising:

an interface unit having a physical layer circuit and a link layer circuit for a communication via the communication line that supplies electric power to the physical layer circuit and the link layer circuit of said interface unit; and a power control unit that supplies power to a data processing unit and said interface unit, wherein said interface unit works as a repeater that forwards received data to another device using the power supplied from the communication line while the data processing unit remains in a shutdown mode in which said power control unit stops supplying power to the data processing unit and said interface unit, and wherein said power control unit begins to supply power to said interface unit and said data processing unit to restore them from the shutdown mode when said link layer circuit receives a predetermined signal in the shutdown mode.

2. The apparatus according to claim 1, wherein said interface unit controls a communication in accordance with the IEEE1394 serial bus standard.

3. The apparatus according to claim 1, wherein said interface unit holds a signal level of an electrical connection unit with said power control unit at a predetermined level.

4. A power control method in a data processing apparatus which comprises an interface unit having a physical layer circuit and a link layer circuit for a communication via a communication line that supplies electric power to the physical layer circuit and the link layer circuit of said interface unit, and a power control unit that supplies power to a data processing unit and said interface unit, said method comprising:

in said interface unit, a step of working as a repeater that forwards received data to another device using the power supplied from the communication line while the data processing unit remains in a shutdown mode in which said power control unit stops supplying power to the data processing unit and said interface unit, and in said power control unit, supplying power to said interface unit and said data processing unit to restore them from the shutdown mode when said link layer circuit receives a predetermined signal in the shutdown mode.

5. A computer readable storage medium storing a computer program to be executed by a computer which comprises an interface unit having a physical layer circuit and a link layer circuit for a communication via a communication line that supplies electric power to the physical layer circuit and the link layer circuit of said interface unit, and a power control unit that supplies power to a data processing unit and said interface unit, said program comprising codes for performing the steps of:

in said interface unit, a step of working as a repeater that forwards received data to another device using the power supplied from the communication line while the data processing unit remains in a shutdown mode in which said power control unit stops supplying power to the data processing unit and said interface unit, and in said power control unit, supplying power to said interface unit and said data processing unit to restore them from the shutdown mode when said link layer circuit receives a predetermined signal in the shutdown mode.

\* \* \* \* \*